US010211729B2

United States Patent
Duong et al.

(10) Patent No.: US 10,211,729 B2
(45) Date of Patent: Feb. 19, 2019

(54) SWITCHING REGULATOR HAVING IMPROVED TRANSIENT RESPONSE AND CONTROL CIRCUIT THEREOF

(71) Applicant: Samsung Electronics Co., Ltd., Suwon-si, Gyeonggi-do (KR)

(72) Inventors: Quoc hoang Duong, Seoul (KR); Yus Ko, Yongin-si (KR); Pan-jong Kim, Seoul (KR); Hyun-seok Shin, Suwon-si (KR); Jeong-woon Kong, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 74 days.

(21) Appl. No.: 15/469,713

(22) Filed: Mar. 27, 2017

(65) Prior Publication Data
US 2018/0062509 A1    Mar. 1, 2018

(30) Foreign Application Priority Data
Aug. 26, 2016   (KR) .................... 10-2016-0109552

(51) Int. Cl.
*G05F 1/56*  (2006.01)
*H02M 3/156*  (2006.01)
*H02M 1/08*  (2006.01)
*H02M 1/00*  (2006.01)

(52) U.S. Cl.
CPC ............. *H02M 3/156* (2013.01); *H02M 1/08* (2013.01); *H02M 2001/0009* (2013.01)

(58) Field of Classification Search
CPC ....................................................... G05F 1/56
USPC ........................................ 323/280–289, 351
See application file for complete search history.

(56) References Cited

U.S. PATENT DOCUMENTS

| 6,064,187 A * | 5/2000 | Redl ....................... G05F 1/565 323/224 |
| 7,615,973 B2 | 11/2009 | Uehara |
| 7,671,575 B1 * | 3/2010 | Suzuki .................. H02M 3/156 323/284 |
| 7,764,054 B1 * | 7/2010 | Guo ....................... H02M 3/156 323/224 |
| 7,777,472 B2 | 8/2010 | Uehara |

(Continued)

FOREIGN PATENT DOCUMENTS

KR        10-1404568 B1    6/2014

*Primary Examiner* — Adolf Berhane
*Assistant Examiner* — Nusrat Quddus
(74) *Attorney, Agent, or Firm* — Harness, Dickey & Pierce, P.L.C.

(57) ABSTRACT

A control circuit in a switching regulator, the switching regulator including an inductor and a switching circuit configured to control a current passing through the inductor in response to a control signal, the control circuit configured to receive a feedback voltage of an output voltage of the switching regulator and receive the current passing through the inductor as a current sensing signal. The control circuit includes a first internal signal generator configured to generate a first internal signal based on the feedback voltage and a reference voltage, a second internal signal generator configured to generate a second internal signal based on the current sensing signal such that a base level of the second internal signal varies according to the feedback voltage and the reference voltage, and a comparator configured to output the control signal based on the first and second internal signals.

18 Claims, 16 Drawing Sheets

(56) References Cited

U.S. PATENT DOCUMENTS

| | | | |
|---|---|---|---|
| 8,054,059 B2 | 11/2011 | Wu | |
| 8,138,734 B2 | 3/2012 | Xi et al. | |
| 8,593,125 B1 | 11/2013 | Xue | |
| 9,024,597 B2 | 5/2015 | Zhang et al. | |
| 9,183,786 B2 | 11/2015 | Yamada | |
| 9,293,988 B2 | 3/2016 | Lee et al. | |
| 9,325,243 B2 | 4/2016 | Jayaraj et al. | |
| 9,621,036 B2* | 4/2017 | Wibben | H02M 3/156 |
| 2010/0148741 A1* | 6/2010 | Chen | H02M 3/158 |
| | | | 323/285 |
| 2013/0328534 A1* | 12/2013 | Hsieh | G05F 3/02 |
| | | | 323/271 |
| 2014/0266110 A1 | 9/2014 | Yuan et al. | |
| 2015/0061615 A1 | 3/2015 | Michishita | |
| 2015/0171732 A1 | 6/2015 | Kim | |
| 2016/0233768 A1* | 8/2016 | de Cremoux | H02M 3/157 |
| 2017/0033689 A1* | 2/2017 | Chen | H02M 3/1582 |

\* cited by examiner

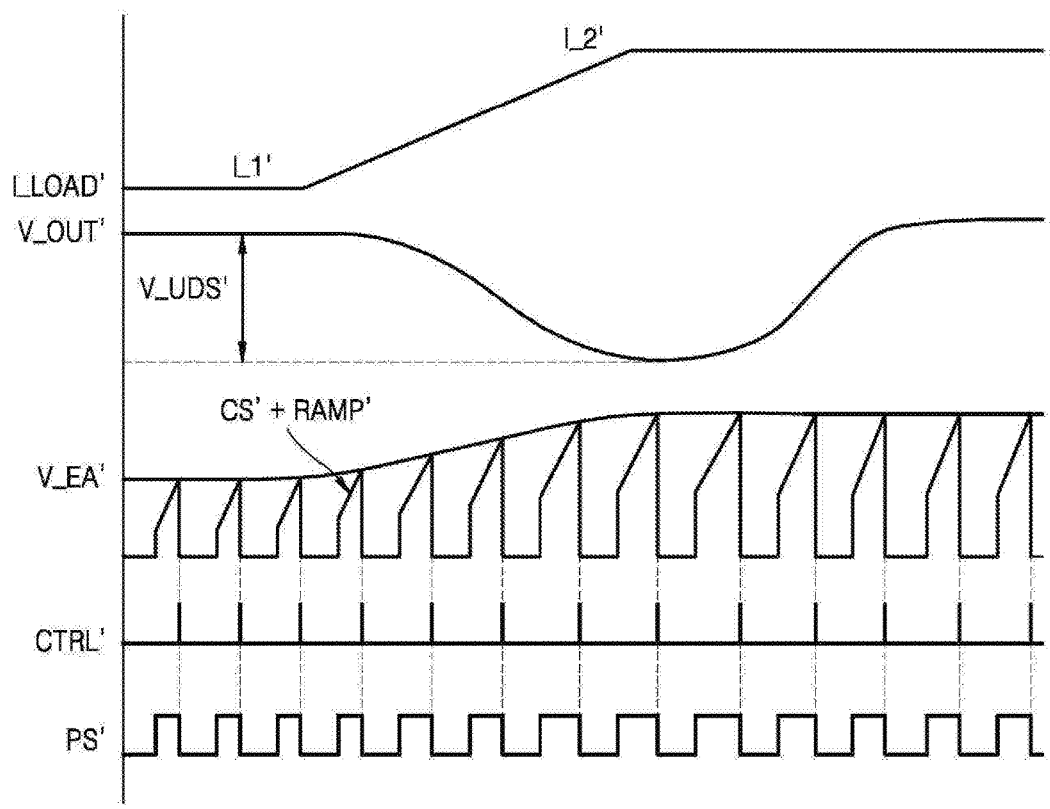

SWITCHING REGULATOR HAVING IMPROVED TRANSIENT RESPONSE AND CONTROL CIRCUIT THEREOF

CROSS-REFERENCE TO RELATED APPLICATION

This application claims the benefit of Korean Patent Application No. 10-2016-0109552, filed on Aug. 26, 2016, in the Korean Intellectual Property Office, the disclosure of which is incorporated herein in its entirety by reference.

BACKGROUND

Inventive concepts relates to a switching regulator, such as a control circuit of the switching regulator, and a control method of the switching regulator.

A switching regulator may refer to an apparatus for generating an output voltage from an input voltage by switching on/off of its device. A switched-mode power supply (SMPS) may refer to a power supply including such a switching regulator. The switching regulator may provide power efficiency and various output voltages and generate supply voltages for components in various systems.

A load of the switching regulator may be changed over time. For example, in a computing system, power consumption may be increased to process a higher amount of calculations in response to a request of a user. Power consumption may be decreased by turning off some components to operate in a low-power mode.

SUMMARY

There is a need for a switching regulator able to stably supply power to a load irrespective of a change of the load.

Inventive concepts provide a switching regulator for providing an enhanced transient response, a control circuit of the switching regulator, and a control method of the switching regulator.

According to inventive concepts, there is provided a control circuit in a switching regulator. The switching regulator may include a switching circuit configured to control current passing through an inductor in response to the inductor and a control signal. The control circuit may be configured to receive a feedback voltage of an output voltage of the switching regulator and receive the current passing through the inductor as a current sensing signal. The control circuit may include a first internal signal generator configured to generate a first internal signal based on the feedback voltage and a reference voltage, a second internal signal generator configured to generate a second internal signal based on the feedback voltage, the reference voltage, and a current sensing signal, and a comparator configured to output the control signal based on the first and second internal signals.

According to another example embodiment of inventive concepts, there is provided a switching regulator. The switching regulator may include an inductor, a feedback signal generating circuit configured to generate a feedback voltage from an output voltage of the switching regulator and to generate a current sensing signal based on a current passing through the inductor, a control circuit configured to generate a control signal based on the feedback voltage and the current sensing signal, and a switching circuit configured to control the current passing through the inductor in response to the control signal. The control circuit may include a first internal signal generator configured to generate a first internal signal based on the feedback voltage and a reference voltage, a second internal signal generator configured to generate a second internal signal based on the feedback voltage, the reference voltage, and a current sensing signal, and a comparator configured to output the control signal based on the first and second internal signals.

According to another example embodiment of inventive concepts, there is provided a method for controlling a switching regulator. The method may include generating a feedback voltage from an output voltage of the switching regulator and generating a current sensing signal from the current passing through the inductor, generating a first internal signal based on the feedback voltage and a reference voltage, generating a second internal signal based on the feedback voltage, the reference voltage, and a current sensing signal, and generating the control signal based on the first and second internal signals.

At least another example embodiment provides a switching regulator including an input node configured to receive an input load current, an output node configured to output an output load current, a rectifier coupled between the first node and the second node, a switching circuit configured to generate a pulse signal based on the input load current, a clock signal and a control signal and a control circuit. The control circuit includes a first internal signal generator configured to generate a first internal signal, and a second internal signal generator configured to generate an error signal based on a feedback voltage and a reference voltage, the feedback voltage being based on an output voltage at the output node, the second internal signal generator configured to generate a second internal signal based on the error signal and a current sensing signal, the current sensing signal being based on the pulse signal and the input load current, and an output circuit configured to generate the control signal based on the first internal signal and the second internal signal.

BRIEF DESCRIPTION OF THE DRAWINGS

Example embodiments of inventive concepts will be more clearly understood from the following detailed description taken in conjunction with the accompanying drawings in which:

FIG. 3 is a drawing illustrating a waveform chart of signals in a current-mode boost converter of FIG. 2;

DETAILED DESCRIPTION OF EXAMPLE EMBODIMENTS

As used herein, expressions such as "at least one of", when preceding a list of elements, modify the entire list of elements and do not modify the individual elements of the list.

Figure 1:
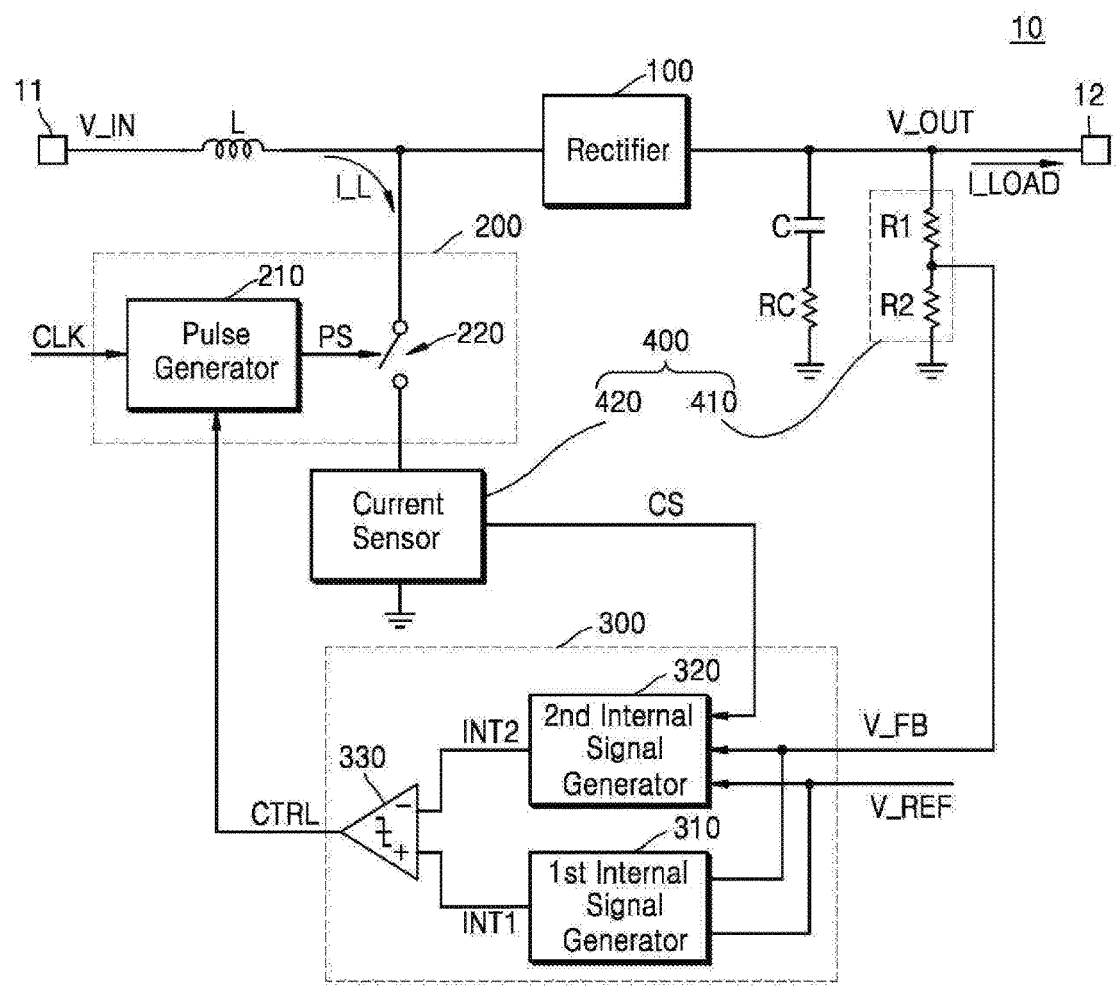
FIG. 1 is a circuit diagram schematically illustrating a switching regulator according to an example embodiment.

FIG. 1 is a circuit diagram schematically illustrating a switching regulator 10 according to an example embodiment. The switching regulator 10 may include a plurality of devices and sub-circuits and may output power regulated from power supplied through an input terminal 11 through an output terminal 12.

As shown in FIG. 1, the switching regulator 10 according to an example embodiment may be a direct current (DC)-DC converter and may be a boost converter (or a boost DC-DC converter). In other words, the switching regulator 10 may generate an output voltage V_OUT which is higher than an input voltage V_IN. The switching regulator 10 may be widely used for various applications such as an audio speaker driver, a portable mobile device, a light emitting diode (LED) driver, and a liquid crystal display (LCD) bias circuit. Hereinafter, example embodiments are mainly described with reference to the switching regulator 10 which is the boost converter. However, it is understood that example embodiments of inventive concepts are not limited thereto.

The boost converter (or the DC-DC converter) may adjust switch timing of a device through a feedback loop. For example, a voltage-mode control method (or a duty-cycle control method) as one of control methods of the boost converter may include one loop and may directly adjust a duty cycle in response to a change in output voltage. A current-mode control method (or a current-programmed mode control method or a current-injected control method) as one of the control methods of the boost converter may be a multi-loop control method including two loops, that is, an inner current loop (e.g., a loop passing through a current sensing signal CS' and a summing circuit 320' in FIG. 2) and an outer voltage loop (e.g., a loop passing through a feedback voltage V_FB' and an amplifier 310' in FIG. 2). A fixed-frequency peak-current mode control method as one of the current-mode control methods may use a fixed-slope compensation ramp signal. In the fixed-frequency peak-current mode control method, an inductor current (e.g., I_L' of FIG. 2) may be directly controlled, whereas an output voltage may be indirectly controlled by a current loop. In the specification, boost converters controlled based on the current-mode control method will be described.

The boost converter may be requested to stably supply power to its load irrespective of a change in load. For example, referring to FIG. 1, the boost converter may be requested to minimize an overshoot or undershoot which occurs in the output voltage V_OUT upon a change in load current I_LOAD. However, the boost converter may be limited in bandwidth due to a right half plane (RHP) zero. Thus, a response speed of a loop to a change in the load current I_LOAD may be limited. In other words, a step load current may cause a high overshoot or undershoot in the output voltage V_OUT. As will be described below, the switching regulator 10 according to example embodiments, the control circuit 300 thereof, and a control method thereof may reduce an overshoot or undershoot in the output voltage V_OUT irrespective of a change in the load current I_LOAD (e.g., occurrence of a step load current) by providing a transient response while minimizing a or causing zero variation in a switching frequency or an electro-magnetic interference (EMI).

Referring to FIG. 1, the switching regulator 10 may include a rectifier 100, a switching circuit 200, the control circuit 300, and a plurality of passive devices L, C, RC, R1, and R2. The inductor L may have one end coupled to the input terminal 11 which receives the input voltage V_IN and may have the other end coupled to the rectifier 100 and the switching circuit 200. A current passing through the inductor L may flow to the ground through the switching circuit 200 based on a switching operation of the switching circuit 200 and may flow to the capacitor C and the output terminal 12 through the rectifier 100.

The rectifier 100 may have one end coupled to the inductor L and the switching circuit 200 and may have the other end coupled to the capacitor C and the output terminal 12. The rectifier 100 may block current flow from a node coupled to the capacitor C and the output terminal 12 to the inductor L or the switching circuit 200.

The switching circuit 200 may connect or disconnect a node coupled to the inductor L and the rectifier 100 with the ground in response to a clock signal CLK and a control signal CTRL. As shown in FIG. 1, the switching circuit 200 may include a pulse generator 210 and a switch 220. The pulse generator 210 may generate a pulse signal PS based on the received clock signal CLK and the received control signal CTRL. For example, the pulse generator 210 may activate the pulse signal PS in response to a rising edge or a falling edge of the clock signal CLK and may deactivate the pulse signal PS in response to the activated control signal CTRL. The switch 220 may connect the node coupled to the inductor L and the rectifier 100 with the ground in response to the activated pulse signal PS (i.e., the switch 220 may be in an ON state). The switch 220 may disconnect the node coupled to the inductor L and the rectifier 100 from the ground in response to the deactivated pulse signal PS (i.e., the switch 220 may be in an OFF state). In other words, an interval where the switch 220 is the ON state may be determined by a duty cycle of the pulse signal PS.

In the ON state of the switch 220, a current passing through the inductor L, that is, an inductor current I_L may flow to the ground through the switch 220. As the interval where the switch 220 is the ON state increases within a period of the clock signal CLK (i.e., as the duty cycle of the pulse signal PS increases), the inductor current I_L may increase in level. If the switch 220 is changed to the OFF state, the increased inductor current I_L may flow to the capacitor C and the output terminal 12 through the rectifier 100. In other words, the switching regulator 10 may control the output voltage V_OUT such that the output voltage V_OUT is kept constant by adjusting the pulse signal PS of turning on/off the switch 220 through its feedback loop.

The feedback signal generating circuit 400 may include a current sensor 420 and a voltage divider 410. The current sensor 420 may sense current passing through the switch 220 and generate a current sensing signal CS. In other words, if the switch 220 is in the ON state in response to the activated pulse signal PS, the current sensing signal CS may have a level corresponding to a level of the inductor current I_L. Meanwhile, if the switch is the OFF state in response to the deactivated pulse signal PS, the current sensing signal CS may have a level corresponding to zero. Therefore, the current sensing signal CS may have a form of oscillating to a switching frequency. The voltage divider 410 may provide a feedback voltage V_FB. The feedback voltage V_FB may be voltage associated with the output voltage V_OUT and may be, as shown in FIG. 1, voltage in which the output voltage V_OUT is divided by the resistors R1 and R2.

The control circuit 300 may receive the feedback voltage V_FB, a reference voltage V_REF, and the current sensing signal CS. When the output voltage V_OUT is a voltage of a desired level, the reference voltage V_REF may be a voltage of the same level as that of the feedback voltage V_FB. The control circuit 300 may generate the control signal CTRL based on a difference between the feedback voltage V_FB and the reference voltage V_REF.

As shown in FIG. 1, the control circuit 300 may include first and second internal signal generators 310 and 320 and a comparator 330. The first internal signal generator 310 may generate a first internal signal INT1 based on the feedback voltage V_FB and the reference voltage VREF, and the second internal signal generator 320 may generate a second internal signal INT2 based on the feedback voltage V_FB, the reference voltage V_REF, and the current sensing signal CS. The comparator 330 may generate the control signal CTRL by comparing the first and second internal signals INT1 and INT2. As will be described below with reference to FIGS. 4A and 4B, the first internal signal INT1 may be generated from a difference between the feedback voltage V_FB and the reference voltage V_REF, and the second internal signal INT2 may be generated from the difference between the feedback voltage V_FB and the reference voltage V_REF and the current sensing signal CS.

According to an example embodiment, as the control circuit 300 generates the second internal signal INT2 further based on the feedback voltage V_FB and the reference voltage V_REF (i.e., the difference between the feedback voltage V_FB and the reference voltage V_REF) as well as the current sensing signal CS, a transient response characteristic of the switching regulator 10 may be improved. In other words, the second internal signal generator 320 may generate the second internal signal INT2 such that an ON interval of the switch 220 is increased when the load current I_LOAD is increased and such that the ON interval of the switch 220 is decreased when the load current I_LOAD is decreased. Therefore, the switching regulator 10 may have an improved transient response and may reduce an overshoot and undershoot of the output voltage V_OUT irrespective of a change in the load current I_LOAD (e.g., occurrence of a step load current).

Figure 2:
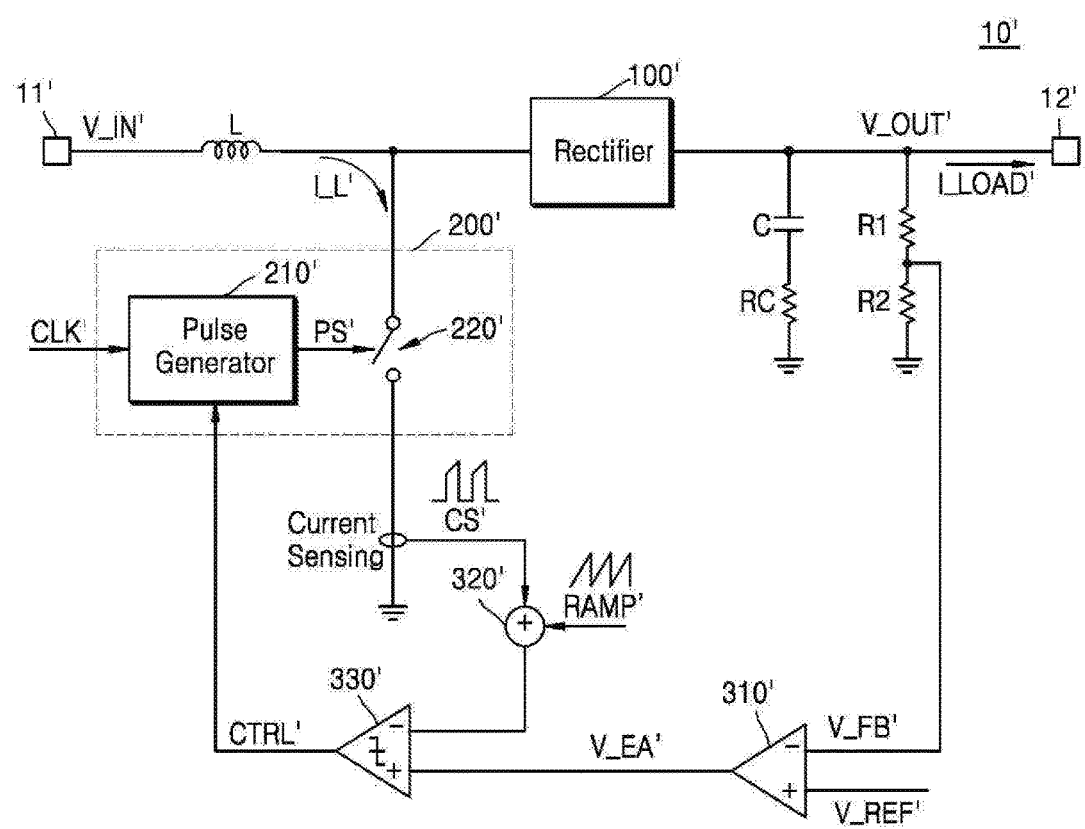
FIG. 2 is a circuit diagram schematically illustrating a current-mode boost converter.

FIG. 2 is a circuit diagram schematically illustrating a boost converter 10'. FIG. 3 is a drawing illustrating a waveform chart of signals in the boost converter 10' of FIG. 2. Referring to FIG. 2, the boost converter 10' may be a current-mode boost converter like a switching regulator 10 of FIG. 1 and may include a rectifier 100', a switching circuit 200', a switching circuit 200', an amplifier 310', a summing circuit 320', a comparator 330', and a plurality of passive devices L, C, RC, R1, and R2.

The boost converter 10' may include first and second loops. The first loop may be a voltage loop and may use an error voltage V_EA' generated based on a difference between a feedback voltage V_FB' and a reference voltage V_REF'. Also, the second loop may be a current loop and may use the sum CS'+RAMP' of a current sensing signal CS' generated by sensing a current passing through a switch 220' of the switching circuit 200' and a ramp signal RAMP'. The sum CS'+RAMP' of the current sensing signal CS' may be compared by the comparator 330' with the error voltage V_EA'. The comparator 330' may generate a control signal CTRL' corresponding to the compared result.

The ramp signal RAMP' summed with the current sensing signal CS' may stabilize the second loop, that is, the current loop, and may increase noise immunity. For example, if the current sensing signal CS' is directly compared with the error voltage V_EA' by the comparator 330', peaking may occur in a switching frequency, that is, a frequency corresponding to a half of a frequency of a clock signal CLK' in the current loop by subharmonic oscillation. However, as shown in FIG. 2, if the saw-toothed ramp signal RAMP', a level of which is increased during a switching period, that is, a period of the clock signal CLK', is summed with the current sensing signal CS', a subharmonic oscillation may become weak due to a compensation ramp and peaking may be damped.

As described above, responsibility to a change in bandwidth and load current I_LOAD' may be limited in the boost converter 10' of FIG. 2 due to a right half plane (RHP) zero. For example, if there is a change in the load current I_LOAD' (e.g., if a step load current occurs), the error voltage V_EA' may respond relatively slowly. Thus, an output voltage V_OUT' may experience a high overshoot or undershoot. The transient response of this boost converter 10' will be described below with reference to a waveform chart of FIG. 3.

Referring to FIG. 3, as power consumption of a load coupled to an output terminal 12' of the boost converter 10' is increased, the load current I_LOAD' may gradually rise from an initial level I_1'. Due to the rising of the load current I_LOAD', the output voltage V_OUT' may start to fall. Thus, the error voltage V_EA' may rise. As the error voltage V_EA' rises, a peak of the other input of the comparator 330' of FIG. 2, that is, a peak of the sum CS'+RAMP' of the current sensing signal CS' and the ramp signal RAMP' may be formed in a higher and higher location. Thus, a time when the control signal CTRL' is activated may be gradually delayed within a switching period, and a duty cycle of the pulse signal PS' may be increased. A large amount of current may be supplied through the inductor L in response to the pulse signal PS', the duty cycle of which is increased. Thus, the output voltage V_OUT' may rise again.

As shown in FIG. 3, a level V_UDS' of an undershoot in the output voltage V_OUT' may be associated with a speed at which current supplied through the inductor L is increased. In other words, if current supplied through the inductor L is not increased as the load current I_LOAD' is increased, the level V_UDS' of the undershoot in the output voltage V_OUT may be increased. As such, a high undershoot in the output voltage V_OUT' due to a slow transient response of the boost converter 10' may cause an error operation of a load of the boost converter 10', that is, each of components which receives the output voltage V_OUT', for example, each of a processor, a memory device, a modem, an input/output (I/O) device, and the like.

Figure 4A:
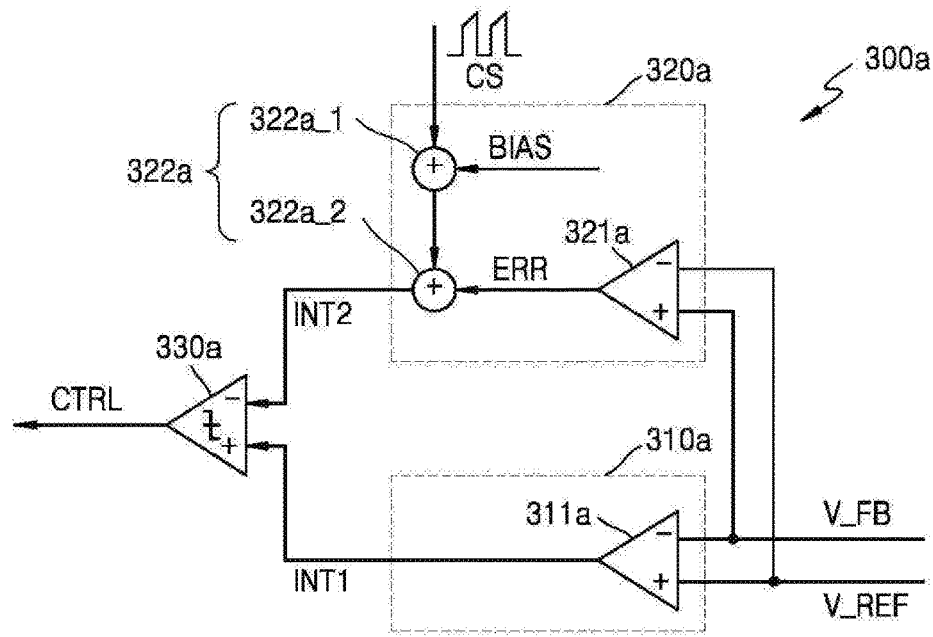
FIGS. 4A and 4B are drawings illustrating examples of a control circuit of FIG. 1 according to example embodiments.
Figure 4B:
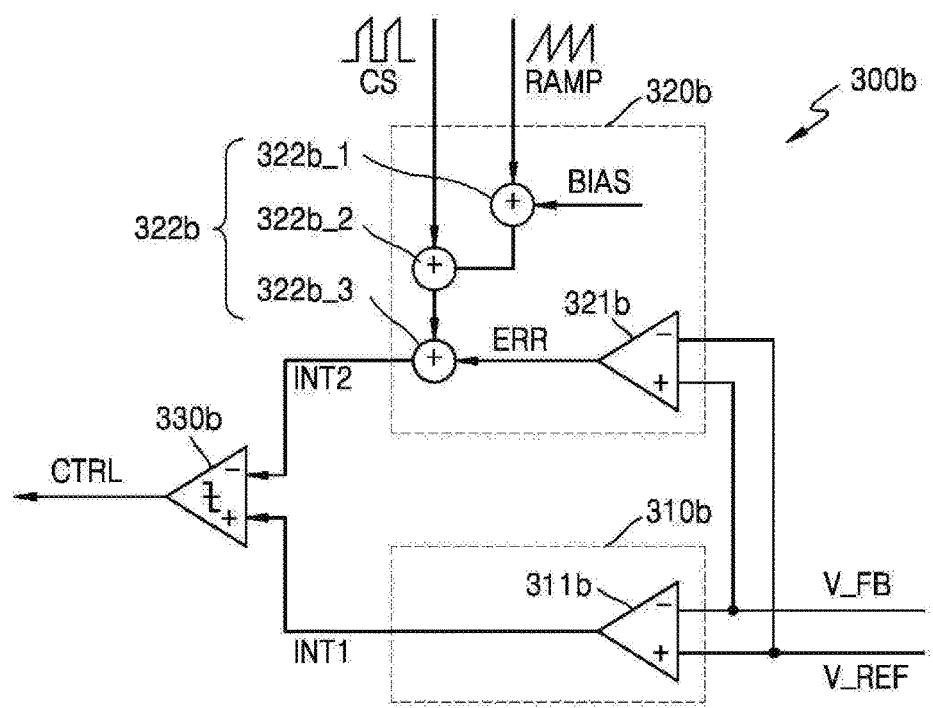

FIGS. 4A and 4B are drawings illustrating examples of a control circuit 300 of FIG. 1 according to example embodiments. As described above with reference to FIG. 1, each of control circuits 300a and 300b may receive a feedback voltage V_FB, a reference voltage V_REF, and a current sensing signal CS and may output a control signal CTRL. Hereinafter, the description of the control circuit 300a of FIG. 4A applies also to the control circuit 300b of FIG. 4B.

Referring to FIG. 4A, the control circuit 300a may include a first internal signal generator 310a, a second internal signal generator 320a, and a comparator 330a. The first internal signal generator 310a may include a first amplifier 311a. The first amplifier 311a may have an inverting input terminal which receives the feedback voltage V_FB and a non-inverting input terminal which receives the reference voltage V_REF. Thus, the first internal signal generator 310a may generate a first internal signal INT1 having a level in proportion to a difference between the reference voltage V_REF and the feedback voltage V_FB.

The second internal signal generator 320a may include a second amplifier 321a and a summing circuit 322a. As shown in FIG. 4A, the second amplifier 321a may have an inverting input terminal which receives the reference voltage V_REF and a non-inverting input terminal which receives the feedback voltage V_FB. Thus, the second amplifier 321a may generate an error signal ERR having a level in proportion to a difference between the feedback voltage V_FB and the reference voltage V_REF. In other words, the first internal signal INT1 which is the output of the first amplifier 311a of the first internal signal generator 310a and the error signal ERR which is the output of the second amplifier 321a may have different polarities based on the difference between the feedback voltage V_FB and the reference voltage V_REF.

According to an example embodiment, the first and second amplifiers 311a and 321a which respectively generate the first internal signal INT1 and the error signal ERR may have different characteristics. For example, the first amplifier 311a of the first internal signal generator 310a may have relatively high accuracy (e.g., a low input offset or high linearity), whereas the second amplifier 321a of the second internal signal generator 320a may have relatively fast responsibility (e.g., a high bandwidth).

The summing circuit 322a of the second internal signal generator 320a may include first and second summing sub-circuits 322a_1 and 322a_2. The first summing sub-circuit 322a_1 may sum the current sensing signal CS with a bias signal BIAS. The second summing sub-circuit 322a_2 may generate a second internal signal INT2 by summing an output of the first summing sub-circuit 322a_1 with the error signal ERR. The bias signal BIAS may move (e.g., raise or lower) a base level of the current sensing signal CS such that the error signal ERR is reflected in the second internal signal INT2. Thus, the second internal signal INT2 may correspond to a signal, having the base level of the current sensing signal CS which oscillates to a switching frequency being changed based on the error signal ERR. As shown in FIG. 4A, the first internal signal INT1 may be provided to a non-inverting input terminal of the comparator 330a, and the second internal signal INT2 may be provided to an inverting input terminal of the comparator 330a. In other words, in contrast with an example shown in FIG. 2, the error signal ERR corresponding to the difference between the feedback voltage V_FB and the reference voltage V_REF may be summed with the biased current sensing signal CS, and the second internal signal INT2 corresponding to the sum may be compared with the first internal signal INT1. As a result, a switching regular 10 of FIG. 1 may further include an additional loop of tracking a difference between a feedback voltage V_FB and a reference voltage V_REF as well as a voltage loop by the feedback voltage V_FB and a current loop by a current sensing signal CS. Such additional loop by the error signal ERR may be referred to as a fast-correction loop. Due to the fast-correction loop, a switching regulator (e.g., the switching regulator 10 of FIG. 1) may have a fast transient response relative to other switching regulators.

Referring to FIG. 4B, the control circuit 300b may include a first internal signal generator 310b, a second internal signal generator 320b, and a comparator 330b. Compared with the control circuit 300a of FIG. 4A, the second internal signal generator 320b of the control circuit 300b of FIG. 4B may further receive a ramp signal RAMP as well as a current sensing signal CS. As described above with reference to FIG. 2, the ramp signal RAMP may be a saw-toothed signal which rises during a switching period. The switching regulator (e.g., the switching regulator 10 of FIG. 1) may stabilize the current loop and may increase noise immunity by summing the ramp signal RAMP with the current sensing signal CS.

A summing circuit 322b of the second internal signal generator 320b may include first to third summing sub-circuits 322b_1 to 322b_3. The first summing sub-circuit 322b_1 may sum the ramp signal RAMP with a bias signal BIAS. The second summing sub-circuit 322b_2 may sum the current sensing signal CS with an output of the first summing sub-circuit 322b_1. Also, the third summing sub-circuit 322b_3 may generate a second internal signal INT2 by summing an output of the second summing sub-circuit 322b_2 with an error signal ERR. In other words, compared with the example shown in FIG. 4A, the bias signal BIAS may be summed with the ramp signal RAMP. Thus, as will be described below with reference to FIG. 5, a base level of the sum of the current sensing signal CS and the ramp signal RAMP may be moved by an offset due to the bias signal BIAS.

According to an example embodiment, in contrast with the examples show in FIG. 4B, a second internal signal generator may include summing circuits, each respectively summing bias signals with the current sensing signal CS and the ramp signal RAMP. In this case, an offset of the sum of the current sensing signal CS and the ramp signal RAMP may be determined by the bias signal summed with the current sensing signal CS and the bias signal summed with the ramp signal RAMP.

Figure 5:
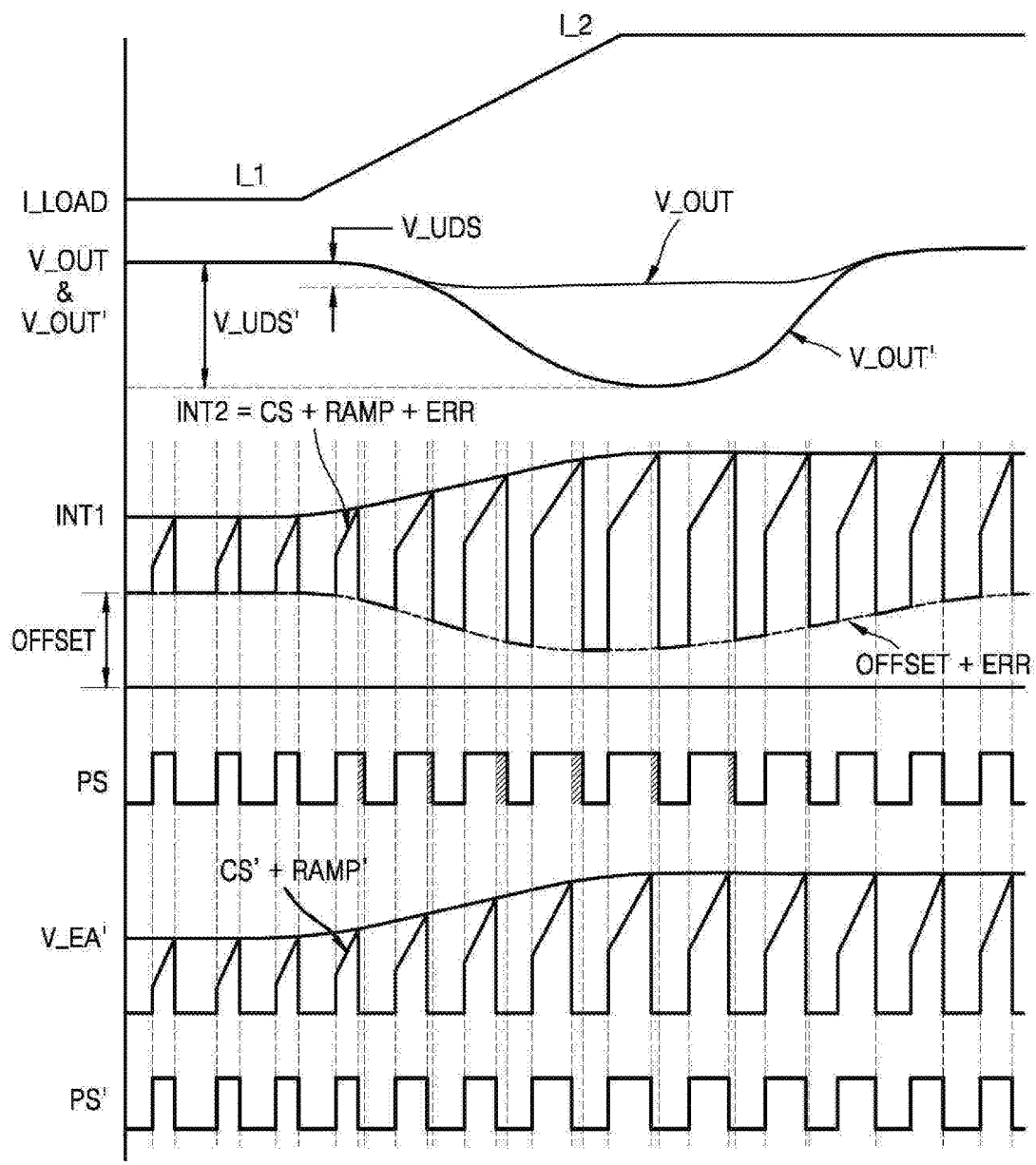
FIG. 5 is a drawing illustrating a waveform chart of signals in a switching regulator including a control circuit according to an example embodiment.

FIG. 5 is a drawing illustrating a waveform chart of signals in a switching regulator including a control circuit according to an example embodiment. In detail, FIG. 5 is a drawing illustrating a waveform chart of signals, if a switching regulator 10 of FIG. 1 includes a control circuit 300b of FIG. 4B, that is, if a control circuit 300 of FIG. 1 is implemented with the control circuit 300b of FIG. 4B. Also, to compare with a boost converter 10' of FIG. 2, FIG. 5 is a drawing illustrating a waveform of signals shown in FIG. 2. Hereinafter, a description will be given with reference to FIGS. 1 and 4B.

Referring to FIG. 5, as power consumption of a load coupled to an output terminal 12 of the switching regulator 10 is increased, a load current I_LOAD may gradually rise from an initial level I_1. An output voltage V_OUT may start to fall due to the rising of the load current I_LOAD. Thus, a first internal signal INT1 may rise, whereas an error signal ERR may be changed on the contrary of the first internal signal INT1. In other words, a base level of a second internal signal INT2 corresponding to the sum of a current sensing signal CS, a ramp signal RAMP, and the error signal ERR may fall from an initial offset. Thus, as shown in FIG. 5, a peak of the second internal signal INT2 may be formed at a time which is more delayed than an error voltage V_EA' of FIG. 3 within a switching period. The pulse signal PS may have an active pulse width (i.e., a duty cycle) which is wider than that of a pulse signal PS' of FIG. 3.

As shown in FIG. 5, a level V_UDS of an undershoot in the output voltage V_OUT may be lower than a level V_UDS' of an undershoot of FIG. 3. In other words, current supplied through an inductor L may be increased due to the pulse signal PS having a duty cycle which is increased. A falling width of the output voltage V_OUT may be decreased. As a result, the switching regulator 10 may provide a fast transient response relative to other switching regulators.

To reflect the error signal ERR in the second internal signal INT2, as shown in FIG. 5, the second internal signal INT2 may have an offset OFFSET. For example, a base level of the current sensing signal CS may include an offset OFFSET, and a base level of the ramp signal RAMP may include an offset OFFSET. An offset OFFSET may be formed by summing the offset included in the base level of the current sensing signal CS with the offset included in the base level of the ramp signal RAMP. Also, the error signal ERR may include an offset OFFSET. As will be described with reference to FIGS. 7A and 7B, a bias signal may be further summed. The offset OFFSET may have a suitable level such that the sum of the current sensing signal CS, the ramp signal RAMP, and the error signal ERR (or the sum of a current sensing signal CS and an error signal ERR in an example of FIG. 4A) is within an input range of a comparator 330b of FIG. 4B.

FIG. 5 illustrates the example in which the undershoot occurs in the output voltage V_OUT due to the increase in the load current I_LOAD. However, it is understood that an overshoot of a relatively low level occurs when an overshoot occurs in the output voltage V_OUT due to a decrease in the load current I_LOAD. In other words, as power consumption of a load is reduced, the load current I_LOAD may be reduced. The output voltage V_OUT may rise due to the reduced load current I_LOAD. The first internal signal INT1 falls due to the rising output voltage V_OUT, whereas the error signal ERR may be changed on the contrary of the first internal signal INT1 and a base level of the second internal signal INT2 may rise (e.g., from the offset OFFSET of FIG. 5). Thus, a peak of the second internal signal INT2 may be formed at a relatively fast time, and the pulse signal PS may have an active pulse width (i.e., a duty cycle) which is narrower than the pulse signal PS' of FIG. 3. As a result, the output voltage V_OUT may be reduced again at a time due to a reduced current passing through the inductor L, and an overshoot of a relatively low level may occur.

Figure 6A:
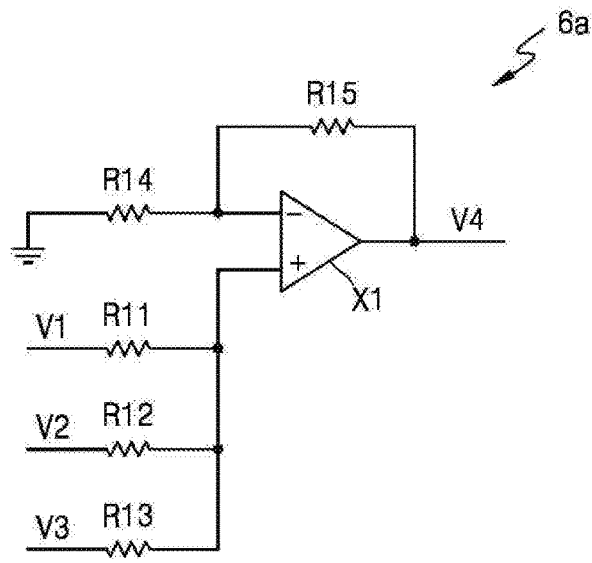
FIGS. 6A and 6B are circuit diagrams schematically illustrating examples of a summing circuit according to an example embodiment.
Figure 6B:
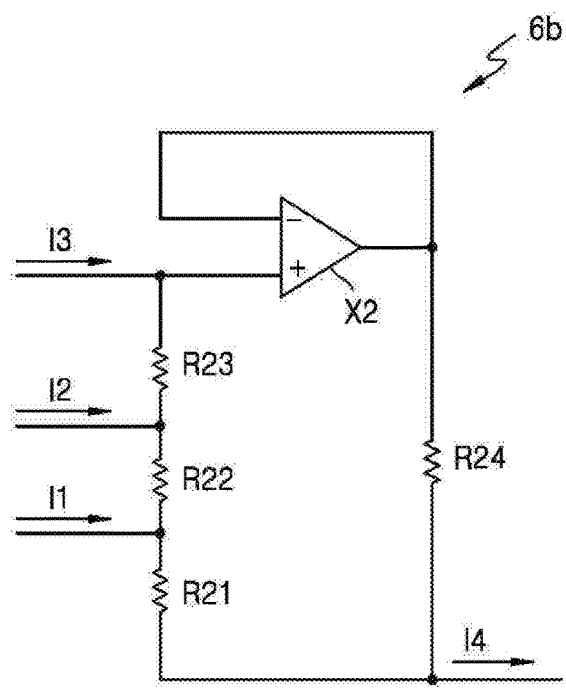

FIGS. 6A and 6B are circuit diagrams schematically illustrating examples of a summing circuit according to an example embodiment. In detail, FIG. 6A illustrates a circuit 6a for summing two or more voltages. FIG. 6B illustrates a circuit 6b for summing two or more currents. It is understood that the summing circuits 6a and 6b shown in FIGS. 6A and 6B are only examples and that various summing circuits which are not shown in FIGS. 6A and 6B may be used in a switching regulator (or a control circuit) according to an example embodiment. The summing circuits 6a and 6b shown in FIGS. 6A and 6B may sum three inputs. However, it is understood that modified summing circuits are possible to sum two inputs or three or more inputs.

Referring again to FIGS. 4A and 4B, each of the input signals CS, RAMP, and ERR of the summing circuits 322a and 322b may correspond to a current, a level of which varies, and to a voltage, a level of which varies. For example, the current sensing signal CS may be a signal, current of which varies in level and may be a signal, voltage of which varies in level, based on a level of a sensed current. Thus, each of the summing circuits 322a and 322b may be a voltage summing circuit (e.g., the summing circuit 6a of FIG. 6A), a current summing circuit (e.g., the summing circuit 6b of FIG. 6B), or a voltage/current summing circuit based on shapes of the input signals.

Referring to FIG. 6A, the voltage summing circuit 6a may be a non-inverting summing circuit, may include an operational amplifier X1 and a plurality of resistors R11 to R15, and may generate an output voltage V4 by summing three input voltages V1 to V3 using the same or different weight values. The weight values for the input voltages V1 to V3 may be determined by resistors R11 to R13. In other words, the output voltage V4 may be determined using Equation 1 below.

$$V4 = V1 \cdot \frac{R12 \cdot R13 \cdot (R14 + R15)}{R14 \cdot (R11 \cdot R12 + R12 \cdot R13 + R11 \cdot R13)} + V2 \cdot \frac{R11 \cdot R13 \cdot (R14 + R15)}{R14 \cdot (R11 \cdot R12 + R12 \cdot R13 + R11 \cdot R13)} + V3 \cdot \frac{R11 \cdot R12 \cdot (R14 + R15)}{R14 \cdot (R11 \cdot R12 + R12 \cdot R13 + R11 \cdot R13)} \quad \text{[Equation 1]}$$

For example, if values of the resistors R11 to R13 coupled to a non-inverting input terminal of the operational amplifier X1 are identical to a value of a resistor R14 coupled between an inverting input terminal of the operational amplifier X1 and the ground and if a feedback resistor R15 has half the value of the resistor R14 (i.e., R11=R12=R13=R14=½R15), the output voltage V4 may be identical to the sum of the input voltages V1 to V3 (i.e., V4=V1+V2+V3).

Referring to FIG. 6B, the current summing circuit 6b may be a non-inverting summing circuit, may include an operational amplifier X2 and a plurality of resistors R21 to R24, and may generate an output current I4 by summing three input currents I1 to I3 using the same or different weight values. The weight values for the input currents I1 to I3 may be determined by the resistors R21 to R23. In other words, the output current I4 may be determined using Equation 2 below.

$$I4 = I1 \cdot \frac{R21 + R24}{R24} + I2 \cdot \frac{R21 + R22 + R24}{R24} + I3 \cdot \frac{R21 + R22 + R23 + R24}{R24} \quad \text{[Equation 2]}$$

Figure 7A:
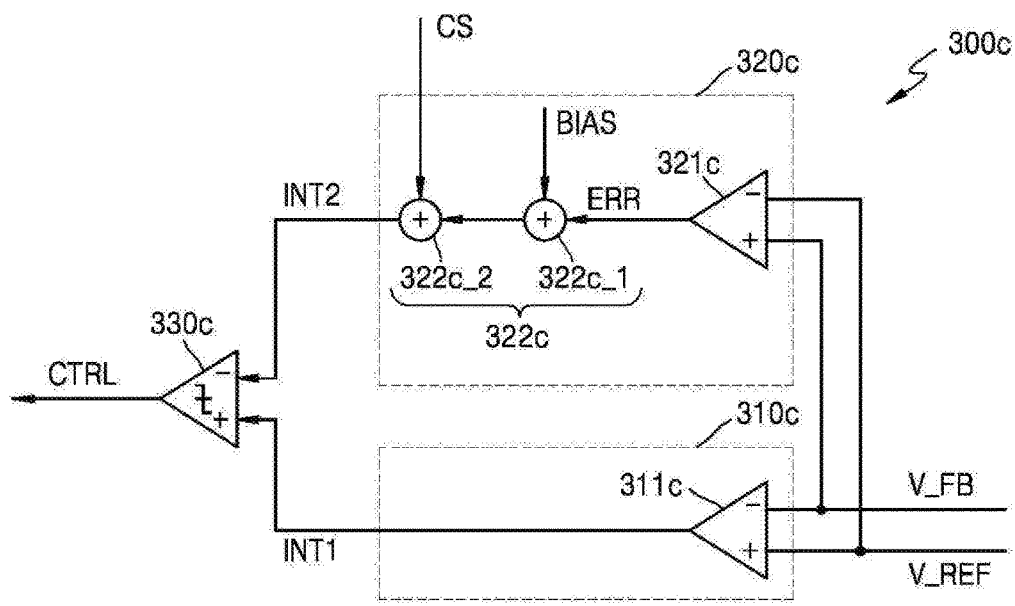
FIGS. 7A and 7B are drawings illustrating examples of a control circuit of FIG. 1 according to example embodiments.
Figure 7B:
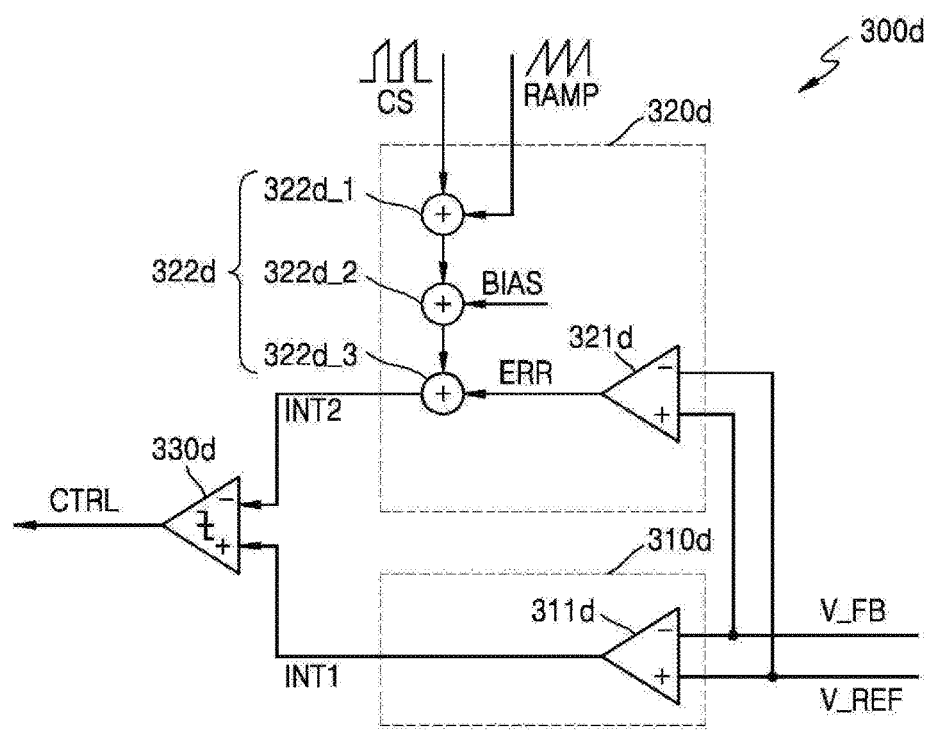

FIGS. 7A and 7B are drawings illustrating examples of a control circuit 300 of FIG. 1 according to example embodiments. In detail, FIGS. 7A and 7B illustrates control circuits 300c and 300d including second internal signal generators 320c and 320d, each of which adds an offset OFFSET to a second internal signal INT2 using a bias signal BIAS, respectively. As described above with reference to FIGS. 4A and 4B, each of the second internal signal generators 320c and 320d may generate the second internal signal INT2 from a feedback signal V_FB, a reference voltage V_REF, and a current sensing signal CS.

As shown in FIGS. 7A and 7B, the control circuits 300c and 300d may include first internal signal generators 310c and 310d, second internal signal generators 320c and 320d, and comparators 330c and 330d, respectively. The first internal signal generators 310c and 310d may include first amplifiers 311c and 311d, respectively, each of which outputs a first internal signal INT1. The second internal signal generators 320c and 320d may include second amplifiers 321c and 321d, each of which outputs an error signal ERR, and summing circuits 322c and 322d, respectively. Hereinafter, no description duplicated by a description of control circuits 300a and 300b of FIGS. 4A and 4B in a description of the control circuits 300c and 300d of FIGS. 7A and 7B will be provided.

Referring to FIG. 7A, according to an example embodiment, the summing circuits 322c may include first and second summing sub-circuits 322c_1 and 322c_2. The first summing sub-circuit 322c_1 may sum the error signal ERR with the bias signal BIAS. The second summing sub-circuit 322c_2 may sum an output of the first summing sub-circuit 322c_1 with the current sensing signal CS. As described above with reference to FIG. 5, a second internal signal INT2 may have an offset OFFSET to reflect the error signal ERR. In the control circuit 300c of FIG. 7A, at least part of the offset OFFSET of the second input signal INT2 may be formed by the bias signal BIAS which is a direct current (DC) signal. For this purpose, the summing circuit 322c may generate the second internal signal INT2 by summing the bias signal BIAS with the error signal ERR.

Referring to FIG. 7B, according to an example embodiment, the summing circuit 322d may include first to third summing sub-circuits 322d_1 to 322d_3. The first summing sub-circuit 322d_1 may sum the current sensing signal CS with the ramp signal RAMP. The second summing sub-circuit 322d_2 may sum an output of the first summing sub-circuit 322d_1 with the bias signal BIAS. Also, the third summing sub-circuit 322d_3 may generate a second internal signal INT2 by summing an output of the second summing sub-circuit 322d_2 with the error signal ERR. As described with reference to FIG. 2, the ramp signal RAMP may be a saw-toothed signal which rises during a switching period. A switching regulator (e.g., a switching regulator 10 of FIG. 1) may stabilize a current loop and may increase noise immunity by summing the ramp signal RAMP with the current sensing signal CS. Thus, the summing circuit 322d may sum the four signals CS, RAMP, ERR, and BIAS by summing the bias signal BIAS for an offset of the second internal signal INT2 with the sum of the current sensing signal CS and the ramp signal RAMP.

Figure 8A:
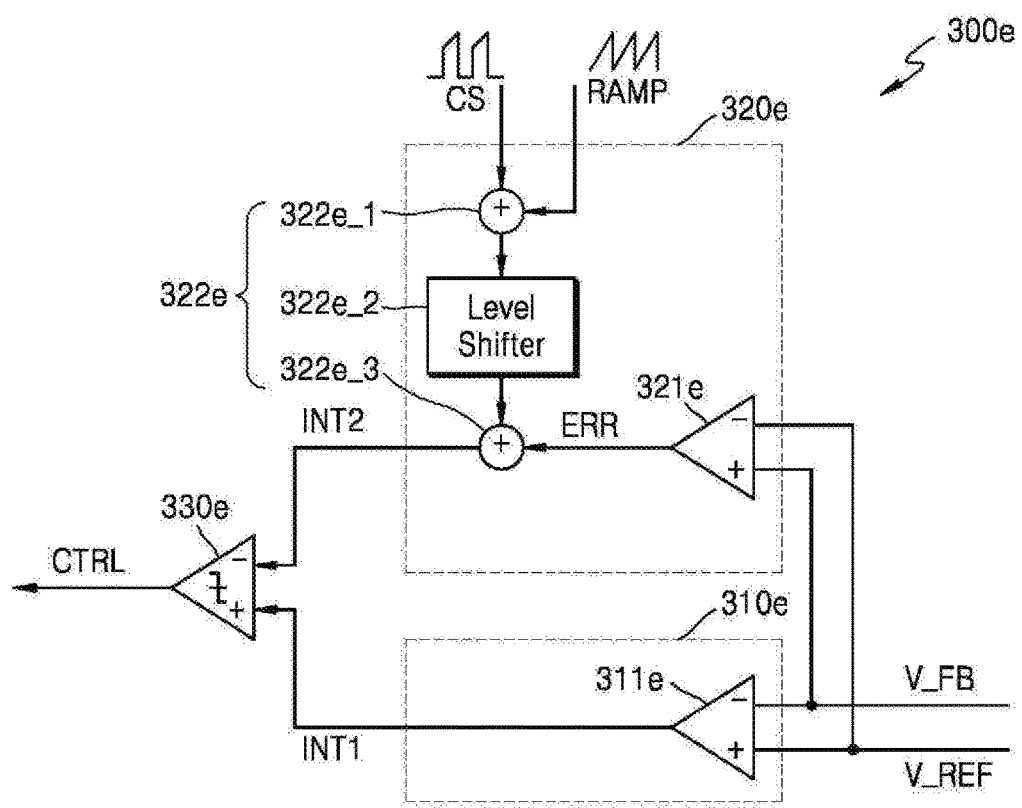
FIGS. 8A, 8B, and 8C are drawings illustrating examples of a control circuit of FIG. 1 according to example embodiments.
Figure 8B:
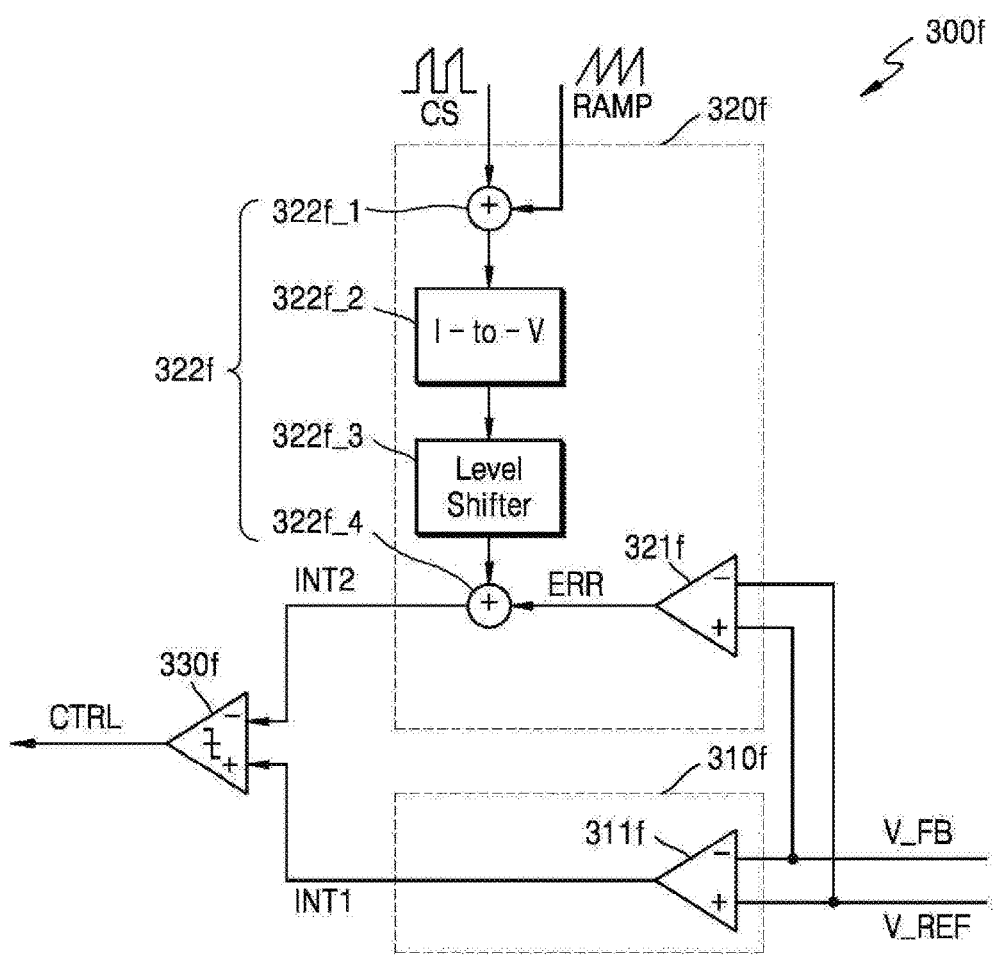
Figure 8C:
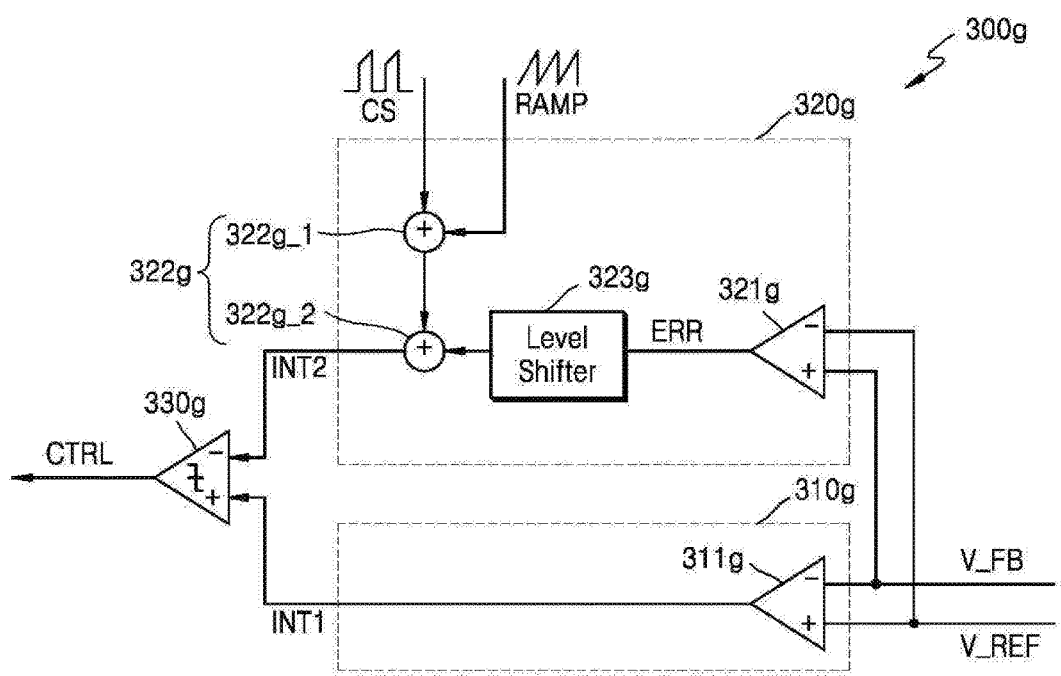

FIGS. 8A to 8C are drawings illustrating examples of a control circuit 300 of FIG. 1 according to example embodiments. In detail, FIGS. 8A to 8C illustrate control circuits 300e, 300f, and 300g including second internal signal generators 320e, 320f, and 320g, each of which adds an offset to a second internal signal INT2 using level shifters 322e_2, 322f_2, and 323g. As described with reference to FIGS. 4A and 4B, each of the second internal signal generators 320e, 320f, and 320g may generate the second internal signal INT2 from a feedback voltage V_FB, a reference voltage V_REF, and a current sensing signal CS.

As shown in FIGS. 8A to 8C, the control circuits 300e to 300g may include first internal signal generators 310e to 310g, second internal signal generators 320e to 320g, and comparators 330e to 330g, respectively. The first internal signal generators 310e to 310g may include first amplifiers 311e to 311g, respectively, each of which outputs a first internal signal INT1. The second internal signal generators 320e to 320g may include second amplifiers 321e to 321g, each of which outputs an error signal ERR, and summing circuits 322e to 322g, each of which sums a current sensing signal CS, a ramp signal RAMP, and an error signal ERR, respectively. Hereinafter, no description duplicated by a description of control circuits 300a and 300b of FIGS. 4A and 4B in a description of the control circuits 300e to 300g of FIGS. 8A to 8C will be provided.

Referring to FIG. 8A, the summing circuit 322e may include first and second summing sub-circuits 322e_1 and 322e_3 and a level shifter 322e_2. The first summing sub-circuit 322e_1 may sum the current sensing signal CS with the ramp signal RAMP. The level shifter 322e_2 may shift a level of an output signal of the first summing sub-circuit 322e_1. In other words, the level shifter 322e_2 may form at least part of an offset OFFSET for reflecting a change of the error signal ERR in a second input signal INT2 by shifting a DC level of the sum of the current sensing signal CS and the ramp signal RAMP. The second summing sub-circuit 322e_3 may sum an output of the level shifter 322e_3 with the error signal ERR.

Referring to FIG. 8B, the summing circuit 322f may include first and second summing sub-circuits 322f_1 and 322f_4, a current-to-voltage (I-to-V) converter 322f_2, and a level shifter 322f_3. In an example of the FIG. 8B, each of the current sensing signal CS and the ramp signal RAMP may have current, a level of which varies. Therefore, the first summing sub-circuit 322f_1 may be a current summing circuit (e.g., a summing circuit of FIG. 6B) and may output current having a level corresponding to the sum of the current sensing signal CS and the ramp signal RAMP. The I-to-V converter 322f_2 may convert a current output from the first summing sub-circuit 322f_1 into a voltage. The level shifter 322f_3 may shift a DC level of the voltage output from the I-to-V converter 322f_2. The second summing sub-circuit 322f_4 may sum an output of the level shifter 322f_3 with the error signal ERR.

Referring to FIG. 8C, the second internal signal generator 320g may include a level shifter 323g for level-shifting the error signal ERR. The summing circuit 322g may include a first summing sub-circuit 322g_1 for summing the current sensing signal CS with the ramp signal RAMP and a second summing sub-circuit 322g_2 for summing an output of the first summing sub-circuit 322g_1 with the level-shifted error signal ERR. In other words, the level shifter 323g may form at least part of an offset OFFSET for reflecting a change of the error signal ERR in a second input signal INT2 by shifting a DC level of the error signal ERR.

According to an example embodiment, in contrast with the examples shown in FIGS. 8A to 8C, a second internal signal generator may include two or more level shifters. For example, the second internal signal generator may include a first level shifter for level-shifting the current sensing signal CS or the sum of the current sensing signal CS and the ramp signal RAMP, a second level shifter for level-shifting the error signal ERR, and a summing circuit for summing the level-shifted both signals.

Figure 9A:
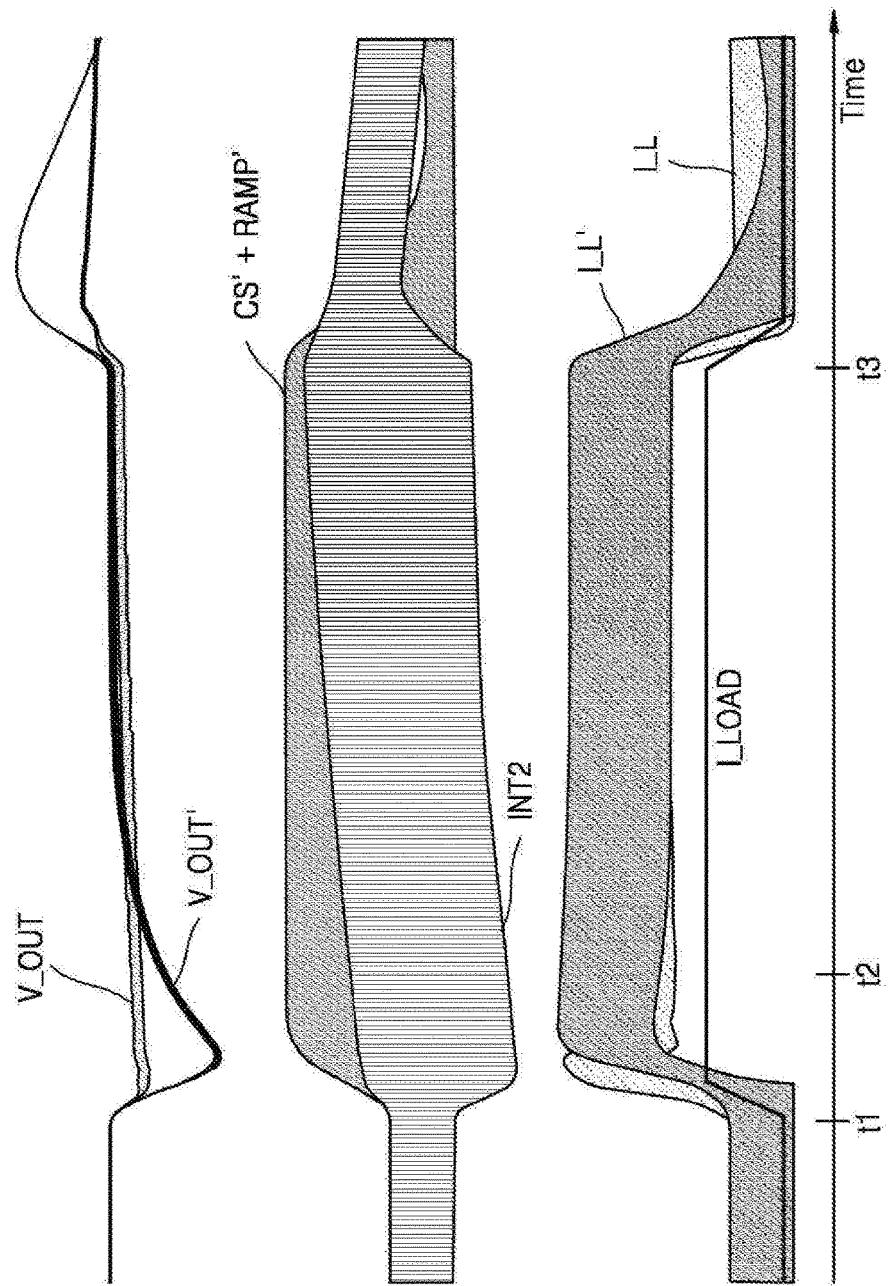
FIGS. 9A and 9B are drawings illustrating results of simulating a switching regulator according to an example embodiment.
Figure 9B:
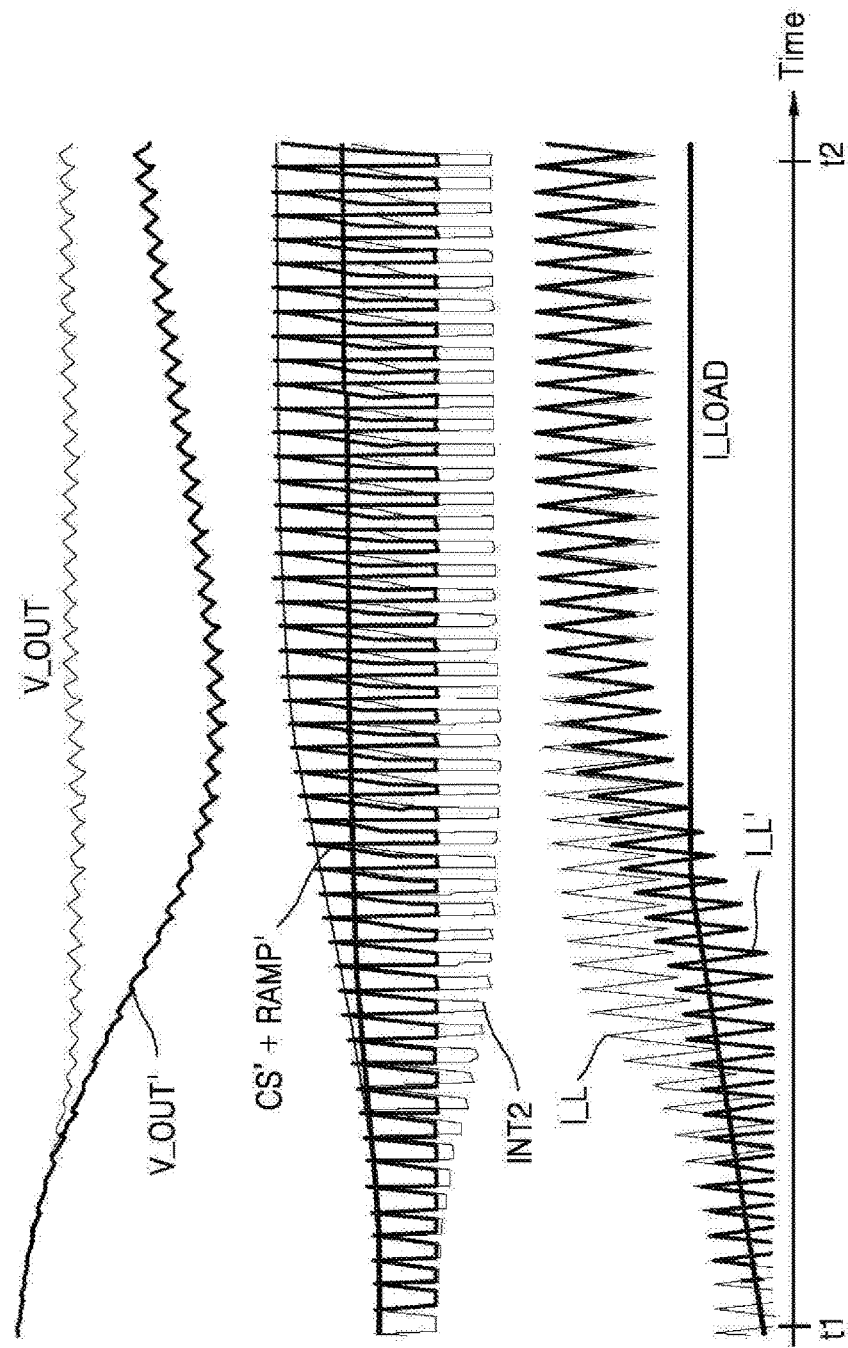

FIGS. 9A and 9B are drawings illustrating results of simulating a switching regulator according to an example embodiment. In detail, FIG. 9A illustrates a result of simulating a switching regulator including a control circuit 300b of FIG. 4B and simulating a boost converter 10' of FIG. 2 in the same condition. FIG. 9B illustrates that a t1-t2 interval of FIG. 9A is expanded. As will be described below, the simulation result of FIGS. 9A and 9B shows a transient response of the switching regulator according to an example embodiment.

Referring to FIGS. 9A and 9B, a load current I_LOAD may start to rise at a time t1. As the load current I_LOAD rises, the sum CS'+RAMP' of a current sensing signal CS' of FIG. 2 and a ramp signal RAMP' may substantially oscillate from a base level, whereas a base level of a second internal signal INT2 may fall. Therefore, an inductor current I_L may be increased faster than an inductor current I_L' of FIG. 2. As a result, an output voltage V_OUT may fall to be lower than an output voltage V_OUT' of FIG. 2. In other words, an undershoot of the output voltage V_OUT may have a lower level than that of the output voltage V_OUT' of FIG. 2. The simulation result shows that the undershoot of the output voltage V_OUT has a higher level than that of the output voltage V_OUT' of FIG. 2 by about ⅓.

Also, referring to FIG. 9A, the load current I_LOAD may start to fall at a time t3. As the load current I_LOAD falls, the sum CS'+RAMP' of the current sensing signal CS' and the ramp signal RAMP' of FIG. 2 may substantially oscillate from the base level, whereas the base level of the second internal signal INT2 may rise. Thus, the inductor current I_L may decrease faster than the inductor current I_L' of FIG. 2. As a result, the output voltage V_OUT may rise to be lower than the output voltage V_OUT' of FIG. 2. In other words, an overshoot of the output voltage V_OUT may have a lower level than that of the output voltage V_OUT' of FIG. 2. The simulation result may show that the overshoot of the output voltage V_OUT has a lower level than that of the output voltage V_OUT' by about ⅓.

Figure 10A:
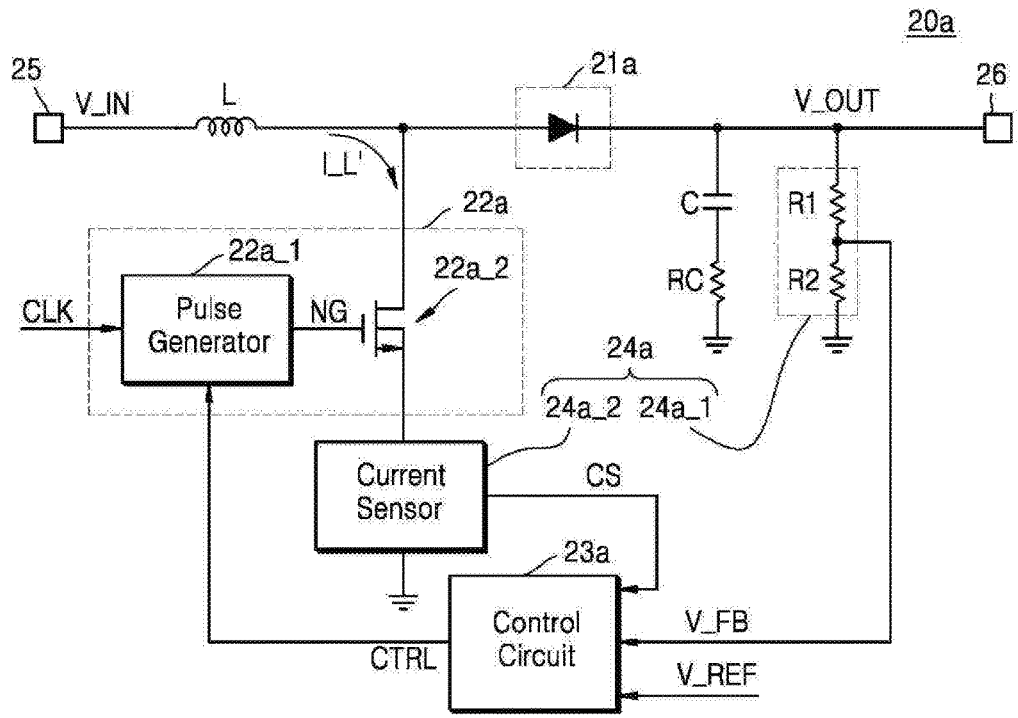
FIGS. 10A and 10B are circuit diagrams schematically illustrating a switching regulator including a control circuit according to an example embodiment.
Figure 10B:
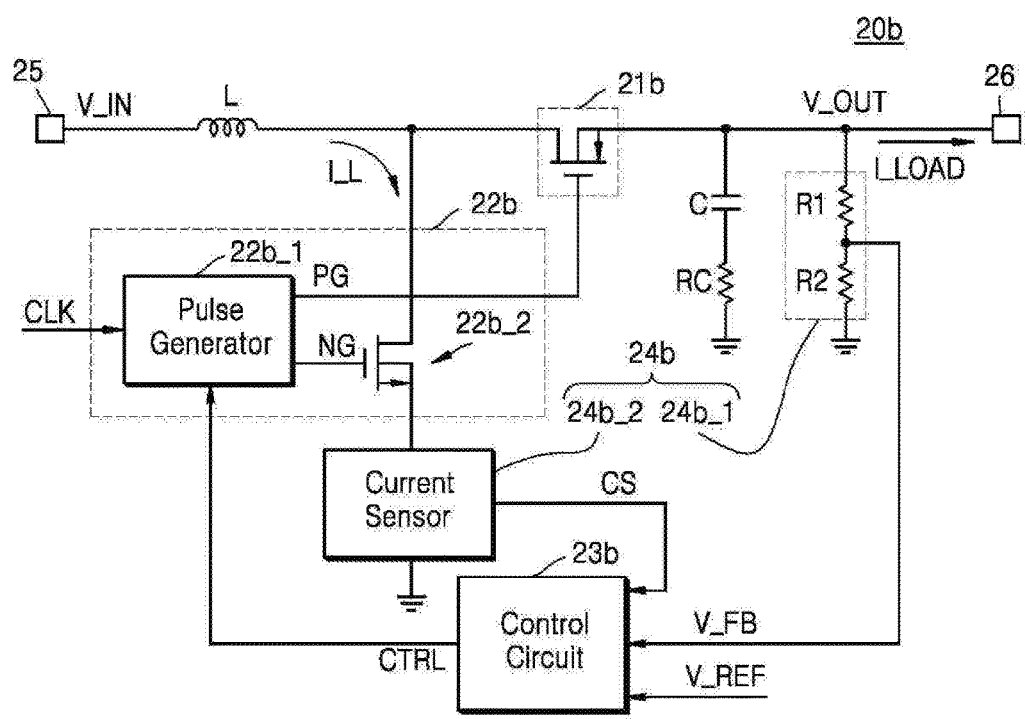

FIGS. 10A and 10B are circuit diagrams schematically illustrating a switching regulator including a control circuit according to an example embodiment. In detail, FIGS. 10A and 10B illustrate boost DC-DC converters including control circuits 23a and 23b according to an example embodiment, respectively.

Referring to FIGS. 10A and 10B, switching regulators 20a and 20b may include rectifiers 21a and 21b, switching circuits 22a and 22b, control circuits 23a and 23b, feedback signal generating circuits 24a and 24b and a plurality of passive devices L, C, RC, R1, and R2, respectively. As described above, the rectifiers 21a and 21b may block a current flow from the capacitor C and an output terminal 26 to the inductor L or the switching circuits 22a and 22b. Each of the feedback signal generating circuits 24a and 24b may provide a feedback voltage V_FB generated by voltage dividers 24a_1 and 24b_1 and a current sensing signal CS generated by current sensors 24a_2 and 24b_2. Each of the control circuit 23a and 23b may generate a control signal CTRL based on the feedback voltage V_FB, a reference voltage V_REF, and the current sensing signal CS. Hereinafter, the same description regarding the switching regulator 10 of FIG. 1 applies to the switching regulators 20a and 20b of FIGS. 10A and 10B and thus will be omitted.

Referring to FIG. 10A, the rectifier 21a may include a diode. The switching circuit 22a may include a pulse generator 22a_1 and a transistor 22a_2. The pulse generator 22a_1 may generate a first gate signal NG for controlling the transistor 22a_2 in response to the control signal CTRL and the clock signal CLK. For example, the pulse generator 22a_1 may activate the first gate signal NG at a rising edge or a falling edge of the clock signal CLK, that is, may supply a high voltage to a gate of a transistor 22a_2. When the control signal is activated, the pulse generator 22a_2 may deactivate the first gate signal NG, that is, may supply a low voltage (e.g., a ground potential) to the gate of the transistor 22a_2.

Referring to FIG. 10B, the rectifier 21b may include a transistor. The switching circuit 22b may include a pulse generator 22b_1 and a transistor 22b_2. The pulse generator 22b_1 may generate a first gate signal NG for controlling the transistor 22b_2 in response to the control signal CTRL and the clock signal CLK and a second gate signal PG for controlling the transistor of the rectifier 21b. In other words, the transistor 22b_2 may function as a first switch in response to the first gate signal NG, and the transistor of the rectifier 21b may function as a second switch in response to the second gate signal PG. As shown in FIG. 10B, the rectifier 21b including the transistor controlled by the second gate signal PG may be referred to as a synchronous rectifier.

The pulse generator 22b_1 may generate the first gate signal NG to be similar to the pulse generator 22a_1 of FIG. 10A and may generate the second gate signal PG synchronized with the first gate signal NG. In other words, the pulse generator 22b_1 may generate the first and second gate signals NG and PG, which are synchronized with each other, such that current passing through the inductor L passes through the transistor 22b_2 of the switching circuit 22b or the transistor of the rectifier 21b. For example, as shown in FIG. 10B, if the transistor 22b_2 of the switching circuit 22b is an N-channel metal oxide semiconductor NMOS transistor and if the transistor of the rectifier 21b is a P-channel metal oxide transistor PMOS transistor, the first and second gate signals NG and PG may be substantially the same as each other.

Figure 11:
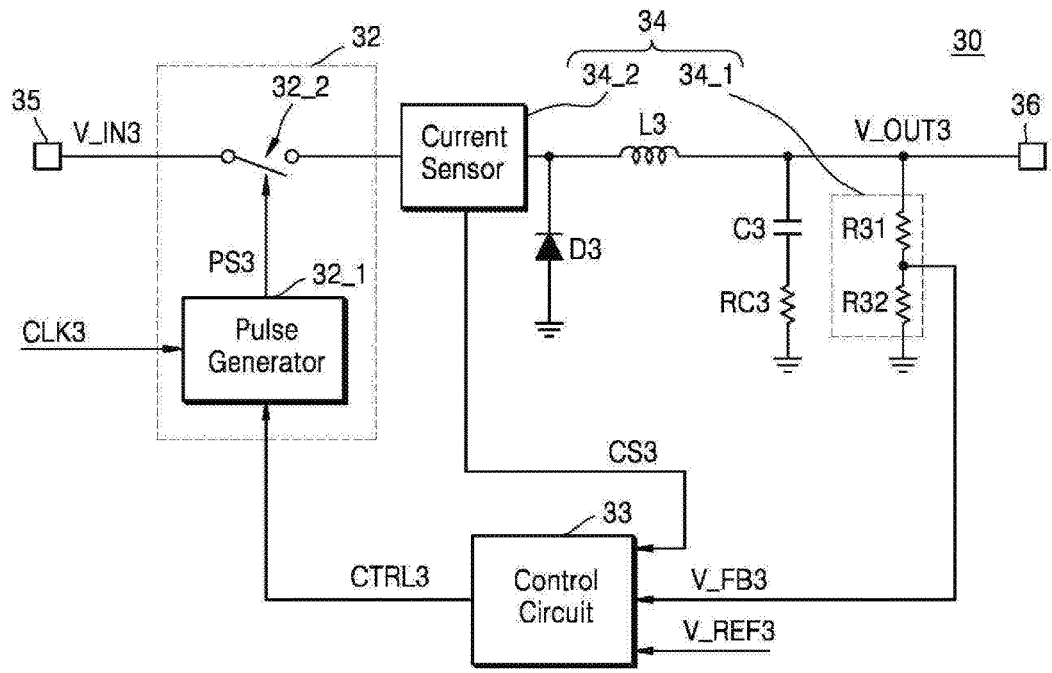
FIGS. 11 and 12 are circuit diagrams schematically illustrating switching regulators, each including a control circuit according to an example embodiment.
Figure 12:
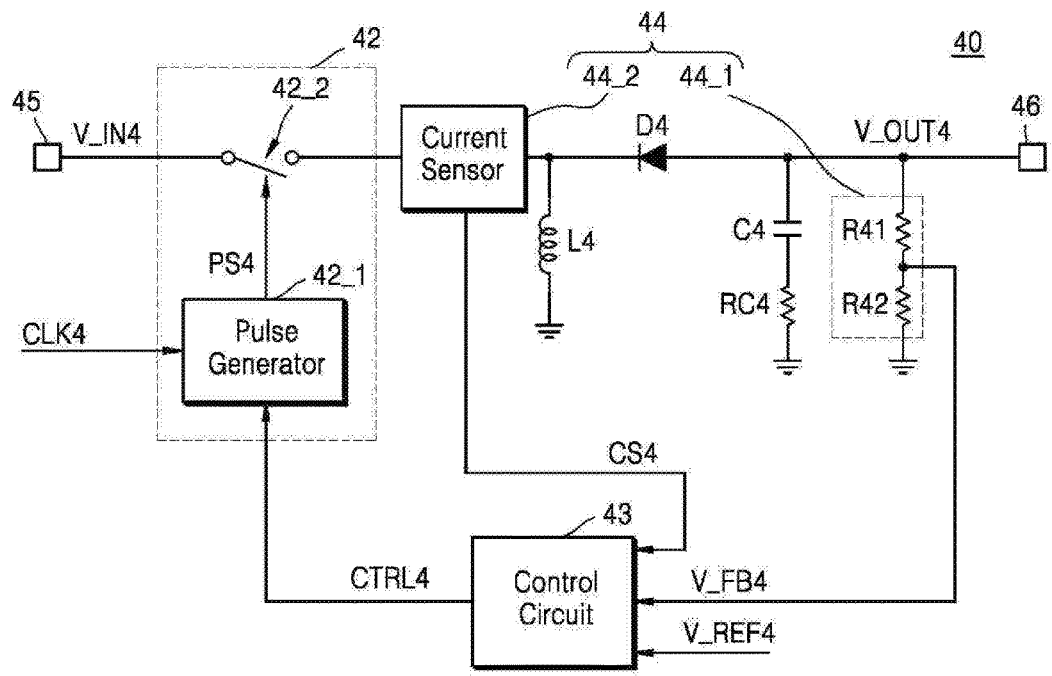

FIGS. 11 and 12 are circuit diagrams schematically illustrating switching regulators, each including a control circuit according to an example embodiment. In detail, FIG. 11 illustrates a buck converter 30 (or a buck DC-DC converter) including a control circuit 33 according to an example embodiment. FIG. 12 illustrates a buck-boost converter 40 (or a buck-boost DC-DC converter) including a control circuit 43 according to an example embodiment. A control circuit of a switching regulator according to an example embodiment may control various switching regulators rather than switching regulators shown in FIGS. 11 and 12. Also, it is understood that a current may be sensed from locations different from the locations shown in FIGS. 11 and 12 to generate current sensing signals CS 3 and CS4 in FIGS. 11 and 12.

Referring to FIG. 11, the buck converter 30 may include a switching circuit 32, the control circuit 33, a feedback signal generating circuit 34 and a plurality of passive devices L3, D3, C3, RC3, R31, and R32, may generate an output voltage V_OUT3 from an input voltage V_IN3 supplied to an input terminal 35, and may output the generated output voltage V_OUT3 through an output terminal 36. The feedback signal generating circuit 34 may include a current sensor 34_2 generating the current sensing signal CS3 and a voltage divider 34_1 generating a feedback voltage V_FB3. According to an example embodiment, the control circuit 33 may generate a control signal CTRL3 based on the feedback voltage V_FB3, a reference voltage V_REF3, and the current sensing signal CS3. For example, the control circuit 33 may generate the control signal CTRL3 by comparing a first internal signal generated from the feedback voltage V_FB3 and the reference voltage V-REF3 with a second internal signal generated from the feedback voltage V_FB3, the reference voltage V_REF3, and the current sensing signal CS3.

The switching circuit 32 may include a pulse generator 32_1 and a switch 32_2. The pulse generator 32_1 may generate a pulse signal PS3 in response to the control signal CTRL3 received from the control circuit 33 and a clock signal CLK3. The switch 32_2 may be turned on/off in response to the pulse signal PS3.

Referring to FIG. 12, the buck-boost converter 40 may include a switching circuit 42, the control circuit 43, a feedback signal generating circuit 44 and a plurality of passive devices L4, D4, C4, RC4, R41, and R42, may generate an output voltage V_OUT4 from an input voltage V_IN4 supplied to an input terminal 45, and may output the generated output voltage V_OUT3 through an output terminal 46. The feedback signal generating circuit 44 may include a current sensor 44_2 generating the current sensing signal CS4 and a voltage divider 44_1 generating a feedback voltage V_FB4. According to an example embodiment, the control circuit 43 may generate a control signal CTRL4 based on a feedback voltage V_FB4, a reference voltage V_REF4, and the current sensing signal CS4. For example, the control circuit 43 may generate the control signal CTRL4 by comparing a first internal signal generated from the feedback voltage V_FB4 and the reference voltage V-REF4 with a second internal signal generated from the feedback voltage V_FB4, the reference voltage V_REF4, and the current sensing signal CS4.

The switching circuit 42 may include a pulse generator 42_1 and a switch 42_2. The pulse generator 42_1 may generate a pulse signal PS4 in response to the control signal CTRL4 received from the control circuit 43 and a clock signal CLK4. The switch 42_2 may be turned on/off in response to the pulse signal PS4.

Figure 13:
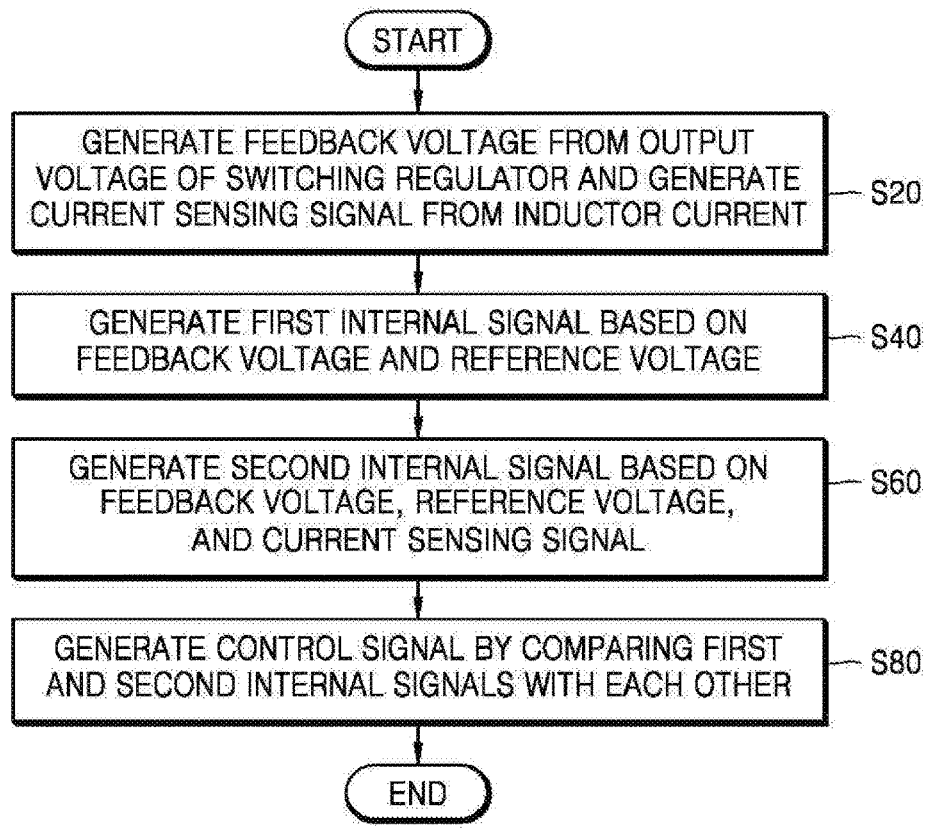
FIG. 13 is a flowchart illustrating a control method of a switching regulator according to an example embodiment.

FIG. 13 is a flowchart illustrating a control method of a switching regulator according to an example embodiment. As shown in FIG. 13, the control method of the switching regulator may include steps S20 to S80. Hereinafter, FIG. 13 will be described with reference to FIG. 1.

In step S20, an operation of generating a feedback voltage from an output voltage of the switching regulator and generating a current sensing signal from an inductor current may be performed. For example, as shown in FIG. 1, a feedback voltage V_FB may be generated by dividing an output voltage V_OUT by resistors R1 and R2. Also, a current sensing signal CS may be generated by sensing current which flows through the switch 220.

In step S40, an operation of generating a first internal signal based on the feedback voltage and a reference voltage may be performed. For example, as shown in FIG. 1, a first internal signal generator 310 of a control circuit 300 may generate a first internal signal INT1 from the feedback voltage V_FB and a reference voltage V_REF. In an embodiment, as shown in FIG. 4A, the feedback voltage V_FB may be supplied to an inverting input terminal of a first amplifier 311a, and the reference voltage V_REF may be supplied to a non-inverting input terminal of the first amplifier 311a. The first internal signal INT1 may be an output of the first amplifier 311a and may have a level corresponding to (or in proportion to) a difference between the feedback voltage V_FB and the reference voltage V_REF.

In step S60, an operation of generating a second internal signal based on the feedback voltage, the reference voltage, and a current sensing signal may be performed. For example, as shown in FIG. 1, the second internal signal generator 320 of the control circuit 300 may generate a second internal signal INT2 from the feedback voltage V_FB, the reference voltage V_REF, and the current sensing signal CS. The second internal signal INT2 may have a form of an oscillation signal, a base level of which varies according to a difference between the feedback voltage V_FB and the reference voltage V_REF. Detailed contents for step S60 will be described below with reference to FIG. 14.

In step S80, an operation of generating a control signal by comparing the first and second internal signals may be performed. For example, as shown in FIG. 1, a comparator 330 of the control circuit 300 may receive the first and second control signals INT1 and INT2 through its non-inverting input terminal and its inverting input terminal and may output a control signal CTRL. The control signal CTRL may be used to determine switching timing of the switching regulator. The control signal CTRL may be used to decrease an undershoot or overshoot of the output voltage V_OUT in level by increasing or decreasing current passing through the inductor L based on a change of a load due to a characteristic of the second internal signal generated in step S60. In other words, the control method of the switching regulator may provide a fast transient response of the switching regulator relative to other control methods.

Figure 14:
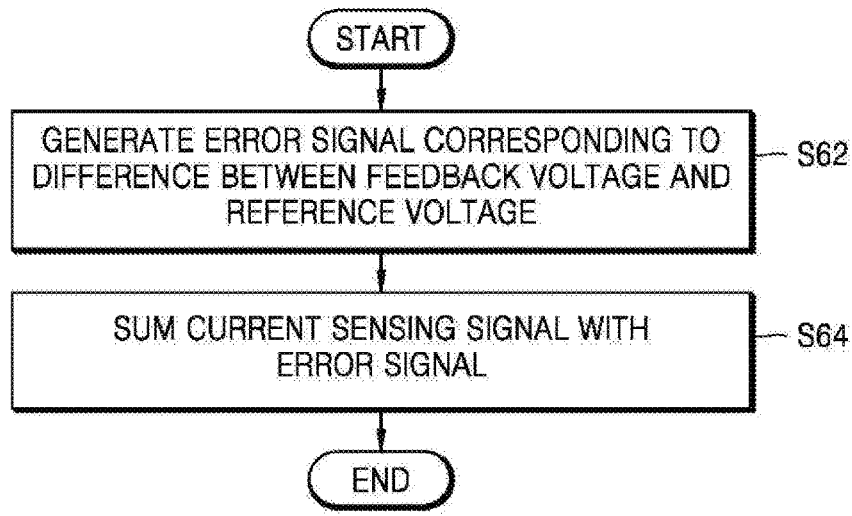
FIG. 14 is a flowchart illustrating an example of step S60 of FIG. 13 according to an example embodiment.

FIG. 14 is a flowchart illustrating an example of step S60 of FIG. 13 according to an example embodiment. As described above with reference to FIG. 13, the operation of generating the second internal signal based on the feedback voltage, the reference voltage, and the current sensing signal in step S60 may be performed.

Referring to FIG. 14, in step S62, an operation of generating an error signal in proportion to a difference between the feedback voltage and the reference voltage may be performed. For example, as shown in FIG. 4A, a reference voltage V_REF may supplied to an inverting input terminal of a second amplifier 321a, and a feedback voltage V_FB may be supplied to the non-inverting input terminal of the second amplifier 321a. The second amplifier 321a may output an error signal ERR corresponding to a difference between the feedback voltage V_FB and the reference voltage V_REF.

In step S64, an operation of summing the current sensing signal with an error signal may be performed. For example, as shown in FIG. 4A, the error signal ERR which is the output of the second amplifier 321a may be summed with a current signal CS by the summing circuit 322a. The second internal signal INT2 may be an oscillation signal, a base level of which varies according to the error signal ERR which is the output of the summing circuit 322a.

According to an example embodiment, in step S64, an operation of summing the current sensing signal, the error signal, and a ramp signal may be performed. For example, the ramp signal may be a saw-toothed signal, a level of which is increased during a switching period. As shown in FIG. 4B, a summing circuit 322b may generate a second internal signal INT2 by summing the current sensing signal CS, a ramp signal RAMP, and the error signal ERR. At this time, at least one of the current sensing signal CS, the ramp signal RAMP, and the error signal ERR may form an offset OFFSET in the second internal signal INT2 such that the second internal signal INT2 is within an input range of a comparator 330a irrespective of a change of the error signal ERR.

According to an example embodiment, in step S64, an operation of summing the current sensing signal, the error signal, and a bias signal may be performed. For example, as shown in FIG. 7A, a bias signal BIAS may be a DC signal which forms the offset OFFSET of the second internal signal INT2. A summing circuit 322c may generate the second internal signal INT2 by summing the current sensing signal CS, the error signal ERR, and the bias signal BIAS. Also, as shown in FIG. 7B, the current sensing signal CS, the error signal ERR, the ramp signal RAMP, and the bias signal BIAS may be summed.

According to an example embodiment, in step S64, an operation of level-shifting the current sensing signal or the error signal and summing the level-shifted signal with the current sensing signal or the error signal may be performed. For example, the current sensing signal CS in the example of the FIG. 4A may be level-shifted before being input to the summing circuit 322a. As shown in FIG. 8A, the sum of the current sensing signal CS and the ramp signal RAMP may be level-shifted. As shown in FIG. 8C, the error signal ERR may be level-shifted.

Figure 15:
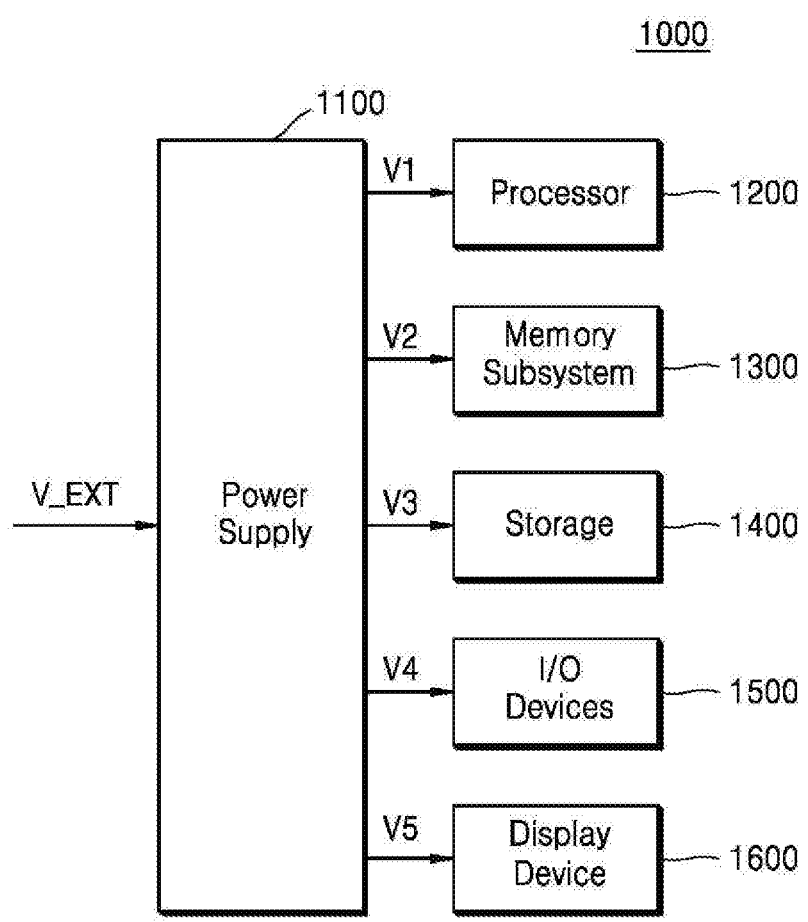
FIG. 15 is a block diagram illustrating a system including a switching regulator according to an example embodiment.

FIG. 15 is a block diagram illustrating a system 1000 including a switching regulator according to an example embodiment. As shown in FIG. 15, the system 1000 may include a power supply 1100, a processor 1200, a memory sub-system 1300, a storage 1400, input/output (I/O) devices 1500, and a display device 1600.

The processor 1200 may perform calculations or tasks. For example, the processor 1200 may be a microprocessor, a central processing unit (CPU), or the like. The processor 1200 may communicate with other components of the system 1000 through a bus. The memory sub-system 1300 and the storage 1400 may store data necessary for an operation of the system 1000. For example, the memory sub-system 1300 may include volatile memory devices such as a dynamic random access memory (DRAM), a static RAM (SRAM), and a mobile DRAM and may include non-volatile memory devices such as a flash memory, an electrically erasable programmable read only memory (EEPROM), a phase-change RAM (PRAM), a resistive RAM (RRAM), a magnetic RAM (MRAM), and a ferroelectrics RAM (FRAM). The storage 1400 may also include the non-volatile memory devices and may include storage media such as a solid state drive (SSD), a hard disk drive (HDD), and a compact disc-ROM (CD-ROM). The I/O devices 1500 may include input means such as a keyboard, a keypad, a touch pad, a touch screen, and a mouse and may include output means such as a speaker and a printer. The display device 1600 may include a liquid crystal display (LCD) device, an organic light emitting display (OLED) device, and the like.

The power supply 1100 may generate supply voltages V1 to V5 based on an external voltage V_EXT and may supply the generated supply voltages V1 to V5 to other components of the system 1000, that is, the processor 1200, the memory sub-system 1300, the storage 1400, the I/O devices 1500, and the display device 1600. For example, the system 1000 may include a battery. Voltage supplied to the power supply 1100 may be a battery voltage supplied from the battery. Alternatively, in another example, the system 1000 may receive power from the outside through a power line. The external voltage V-EXT may be voltage generated from the power supplied through the power line. In other words, the external voltage V_EXT may be the voltage of the power line and may be a DC voltage generated by rectifying an alternating current (AC) voltage supplied from the power line.

The power supply 1100 may include a switching regulator according to an example embodiment, which generates at least one of the supply voltages V1 to V5. In other words, the switching regulator included in the power supply 1100 may include a fast-correction loop as well as a voltage loop and a current loop and may provide a fast transient response relative to other switching regulators. Therefore, other components of the system 1000 may stably receive power from the power supply 1100.

While inventive concepts have been particularly shown and described with reference to embodiments thereof, it will be understood that various changes in form and details may be made therein without departing from the spirit and scope of the following claims.

What is claimed is:

1. A control circuit in a switching regulator, the switching regulator including an inductor and a switching circuit configured to control a current passing through the inductor in response to a control signal, the control circuit configured to receive a feedback voltage of an output voltage of the switching regulator and receive the current passing through the inductor as a current sensing signal, the control circuit comprising:
   a first internal signal generator configured to generate a first internal signal based on the feedback voltage and a reference voltage;
   a second internal signal generator configured to generate a second internal signal based on the current sensing signal such that a base level of the second internal signal varies according to the feedback voltage and the reference voltage; and
   a comparator configured to output the control signal based on the first and second internal signals, wherein the second internal signal generator includes,
      a first amplifier having a first non-inverting input terminal configured to receive the feedback voltage and a first inverting input terminal configured to receive the reference voltage, the first amplifier configured to output an error signal based on the feedback voltage and the reference voltage, and
      a summing circuit configured to generate the second internal signal by summing the current sensing signal with the error signal, the summed signal being the second internal signal.

2. The control circuit of claim 1, wherein the first internal signal generator comprises:
   a second amplifier having a second inverting input terminal configured to receive the feedback voltage and a second non-inverting input terminal configured to receive the reference voltage, the second amplifier configured to output the first internal signal based on the feedback voltage and the reference voltage.

3. The control circuit of claim 1, wherein
   the summing circuit is configured to generate the second internal signal by further summing the current sensing signal, the error signal, and a direct current (DC) bias signal such that the sum of the DC bias signal, the current sensing signal, and the error signal is within an input range of the comparator.

4. The control circuit of claim 1, wherein the summing circuit is configured to further sum the current sensing signal, the error signal, and a saw-toothed ramp signal, a level of the saw-toothed ramp signal increases during a switching period of the switching circuit.

5. The control circuit of claim 4, wherein the saw-toothed ramp signal has a DC offset such that the sum of the current sensing signal, the saw-toothed ramp signal and the error signal is within an input range of the comparator.

6. The control circuit of claim 4, wherein the summing circuit comprises:
   a first summing sub-circuit configured to sum the current sensing signal with the saw-toothed ramp signal;
   a level shifter configured to shift a DC level of an output signal of the first summing sub-circuit such that a sum of the output signal of the first summing sub-circuit and the error signal is within an input range of the comparator; and
   a second summing sub-circuit configured to generate the second internal signal by summing an output signal of the level shifter with the error signal.

7. The control circuit of claim 6, wherein
   the first summing sub-circuit is a current summing sub-circuit, and
   the summing circuit further includes,
      a current-voltage converter configured to convert a current of the output signal of the first summing sub-circuit into a voltage, and the level shifter is configured to shift a DC level of an output signal of the current-voltage converter.

8. The control circuit of claim 1, wherein the second internal signal generator further comprises:
a level shifter configured to shift a DC level of the error signal such that the sum of the current sensing signal and the error signal is within an input range of the comparator,
wherein the summing circuit is configured to sum the current sensing signal with an output signal of the level shifter.

9. The control circuit of claim 1, wherein
the inductor has a first end configured to receive an input voltage and a second end coupled to the switching circuit, and
the switching regulator is a boost converter and the switching regulator further includes,
a rectifier having a first end coupled to the second end of the inductor and a second end configured to output the output voltage, and
a capacitor and a resistor coupled in series between the second end of the rectifier and ground.

10. A switching regulator comprising:
an inductor;
a feedback signal generating circuit configured to generate a feedback voltage from an output voltage of the switching regulator and to generate a current sensing signal based on a current passing through the inductor;
a control circuit configured to generate a control signal based on the feedback voltage and the current sensing signal; and
a switching circuit configured to control the current passing through the inductor in response to the control signal,
wherein the control circuit includes,
a first internal signal generator configured to generate a first internal signal based on the feedback voltage and a reference voltage,
a second internal signal generator configured to generate a second internal signal based on the current sensing signal such that a base level of the second internal signal varies according to the feedback voltage and the reference voltage, and
a comparator configured to output the control signal based on the first and second internal signals, and
the second internal signal generator is configured to generate the second internal signal by summing an error signal with the current sensing signal, the error signal being an amplified difference between the feedback voltage and the reference voltage, and the summed signal being the second internal signal.

11. The switching regulator of claim 10, wherein the first internal signal generator is configured to output the first internal signal by amplifying a difference between the reference voltage and the feedback voltage.

12. The switching regulator of claim 10, wherein
the second internal signal generator is configured to further sum the error signal and the current sensing signal with a DC bias signal, such that the sum of the DC bias signal, the current sensing signal, and the error signal is within an input range of the comparator.

13. The switching regulator of claim 10, wherein the second internal signal generator is configured to further sum the error signal and the current sensing signal with a saw-toothed ramp signal, a level of the saw-toothed ramp signal increases during a switching period of the switching circuit.

14. The switching regulator of claim 13, wherein the saw-toothed ramp signal has a DC offset such that the sum of the current sensing signal, the saw-toothed ramp signal and the error signal is within an input range of the comparator.

15. The switching regulator of claim 13, wherein the second internal signal generator is configured to sum the current sensing signal and the saw-toothed ramp signal and shift a DC level of the summed current sensing and saw-toothed ramp signal and sum the level-shifted signal with the error signal such that the second internal signal is within an input range of the comparator.

16. The switching regulator of claim 10, wherein the second internal signal generator is configured to generate the second internal signal by shifting a DC level of the error signal such that the second internal signal is within an input range of the comparator and sum the level-shifted signal with the current sensing signal.

17. A switching regulator comprising:
an input node configured to receive an input load current;
an output node configured to output an output load current;
a rectifier coupled between the input node and the output node;
a switching circuit configured to generate a pulse signal based on the input load current, a clock signal and a control signal; and
a control circuit including,
a first internal signal generator configured to generate a first internal signal, and
a second internal signal generator configured to generate an error signal based on a feedback voltage and a reference voltage, the feedback voltage being based on an output voltage at the output node, the second internal signal generator configured to generate a second internal signal based on the error signal and a current sensing signal such that a base level of the second internal signal varies according to the feedback voltage and the reference voltage, the current sensing signal being based on the pulse signal and the input load current, the second internal signal generator configured to generate the second internal signal by summing the error signal with the current sensing signal, the error signal being an amplified difference between the feedback voltage and the reference voltage, the summed signal being the second internal signal, and
an output circuit configured to generate the control signal based on the first internal signal and the second internal signal.

18. The switching regulator of claim 17, wherein the switching circuit is configured to change a duty cycle of the pulse signal based on the control signal.

* * * * *